US009469239B2

(12) United States Patent
Armour

(10) Patent No.: US 9,469,239 B2
(45) Date of Patent: Oct. 18, 2016

(54) SIDE-LOADING RATCHET DEVICE

(75) Inventor: Barry Douglas Armour, Dunedin (NZ)

(73) Assignee: Armour Holdings Limited, Dunedin (NZ)

( * ) Notice: Subject to any disclaimer, the term of this patent is extended or adjusted under 35 U.S.C. 154(b) by 12 days.

(21) Appl. No.: 14/344,721

(22) PCT Filed: Sep. 13, 2012

(86) PCT No.: PCT/NZ2012/000165
§ 371 (c)(1),
(2), (4) Date: Mar. 13, 2014

(87) PCT Pub. No.: WO2013/039408
PCT Pub. Date: Mar. 21, 2013

(65) Prior Publication Data
US 2014/0338161 A1 Nov. 20, 2014

Related U.S. Application Data

(60) Provisional application No. 61/535,681, filed on Sep. 16, 2011.

(51) Int. Cl.
*B21F 9/00* (2006.01)
*B66F 3/00* (2006.01)
*B60P 7/08* (2006.01)
*B25B 25/00* (2006.01)

(52) U.S. Cl.
CPC ............... *B60P 7/083* (2013.01); *B25B 25/00* (2013.01); *Y10T 24/2175* (2015.01)

(58) Field of Classification Search
CPC ............ B66D 1/04; B66D 1/06; B66D 1/30; B66D 1/34; B66D 3/02; B60P 7/083; Y10T 24/2175
See application file for complete search history.

(56) References Cited

U.S. PATENT DOCUMENTS

| 3,826,473 | A | 7/1974 | Huber |
| 3,848,889 | A | 11/1974 | Sharrow |
| 4,045,002 | A | 8/1977 | Miller |
| 4,155,537 | A | 5/1979 | Bronson et al. |
| 4,252,158 | A | 2/1981 | McDade |

(Continued)

FOREIGN PATENT DOCUMENTS

| CA | 2385491 A1 | 7/2003 |
| DE | 19731286 A1 | 2/1999 |

(Continued)

OTHER PUBLICATIONS

International Search Report for PCT/NZ2012/000165, ISA/AU, Woden ACT, mailed Dec. 11, 2012.

(Continued)

*Primary Examiner* — Emmanuel M Marcelo
(74) *Attorney, Agent, or Firm* — Harness, Dickey & Pierce, PLC

(57) ABSTRACT

A ratchet device 1 for a strap has a body 105 having a side member 109, and a spool 119 having a side 119a rotatably supported by the side member and a ratchet wheel 121 fixed thereto. The body has a member 161 moveable between an open position in which the other side 119b of the spool is exposed to enable a strap to be laterally loaded into the spool 119 from the exposed side of the spool and laterally unloaded from the spool, and a closed position in which said lateral loading and unloading are prevented.

20 Claims, 20 Drawing Sheets

(56) References Cited

U.S. PATENT DOCUMENTS

| | | |
|---|---|---|
| 4,268,012 A | 5/1981 | Ruehle et al. |
| 4,510,652 A | 4/1985 | van Iperen |
| 4,542,883 A | 9/1985 | Rutzki |
| 4,823,443 A | 4/1989 | Waters |
| 4,954,030 A | 9/1990 | Szucs et al. |
| 5,103,536 A | 4/1992 | Kamper |
| 5,145,299 A | 9/1992 | Stephenson, Jr. |
| 5,156,506 A | 10/1992 | Bailey |
| 5,205,020 A | 4/1993 | Kamper |
| 5,217,208 A | 6/1993 | Stephenson |
| 5,271,127 A | 12/1993 | Christensen |
| 5,271,606 A | 12/1993 | Kamper |
| 5,369,970 A | 12/1994 | Voiculescu et al. |
| 5,494,387 A | 2/1996 | Ruegg |
| 5,549,429 A | 8/1996 | Sergent |
| 5,623,751 A * | 4/1997 | Knutson ............ 24/71.1 |
| 5,778,496 A | 7/1998 | Huang |
| 5,806,837 A * | 9/1998 | Cargill et al. ............ 254/266 |
| 5,816,185 A | 10/1998 | Ruthrford |
| 5,894,638 A | 4/1999 | Huang |
| 5,943,742 A | 8/1999 | Huang |
| 6,007,053 A | 12/1999 | Huang |
| 6,059,499 A | 5/2000 | Bird |
| 6,203,259 B1 | 3/2001 | Christensen |
| 6,273,654 B1 | 8/2001 | Whitaker |
| 6,279,847 B1 | 8/2001 | Berger |
| 6,398,470 B1 | 6/2002 | Mosley |
| 6,402,446 B1 | 6/2002 | Nadherny et al. |
| 6,457,701 B1 | 10/2002 | Huang |
| 6,524,041 B1 | 2/2003 | Voiculescu |
| 6,626,621 B1 | 9/2003 | Hugg |
| 6,799,751 B1 | 10/2004 | Anderson |
| 6,939,095 B1 | 9/2005 | Hugg |
| 7,350,768 B1 | 4/2008 | Chang |
| 7,422,401 B2 | 9/2008 | Frett et al. |
| 7,566,194 B1 | 7/2009 | Gray et al. |
| 7,758,023 B2 | 7/2010 | Chang |
| 7,766,271 B1 | 8/2010 | Confoey |
| 7,824,138 B2 | 11/2010 | Bullock |
| 8,272,820 B2 * | 9/2012 | Numata ............ 410/103 |
| 2001/0022922 A1 | 9/2001 | Hornady |
| 2003/0000047 A1 | 1/2003 | Mamie et al. |
| 2003/0082022 A1 | 5/2003 | Botelho |
| 2003/0111650 A1 | 6/2003 | Gleinser |
| 2004/0013490 A1 | 1/2004 | Cauchon |
| 2004/0202520 A1 * | 10/2004 | Guenther ............ 410/103 |
| 2005/0111929 A1 | 5/2005 | Tessier et al. |
| 2005/0145747 A1 | 7/2005 | Breeden et al. |
| 2005/0286986 A1 | 12/2005 | Thomson et al. |
| 2006/0263160 A1 | 11/2006 | Howes |
| 2008/0273937 A1 | 11/2008 | Hanson |
| 2009/0271976 A1 * | 11/2009 | Huang et al. ............ 29/802 |
| 2010/0064489 A1 | 3/2010 | Hanson |
| 2012/0227223 A1 * | 9/2012 | Knox ............ 24/68 CD |
| 2013/0025098 A1 * | 1/2013 | Smith ............ 24/68 CD |
| 2013/0239374 A1 * | 9/2013 | Takkinen ............ 24/69 CT |

FOREIGN PATENT DOCUMENTS

| | | |
|---|---|---|
| EP | 0042257 A1 | 12/1981 |
| EP | 0050467 A1 | 4/1982 |
| EP | 0634305 A1 | 1/1995 |
| EP | 661758 A2 | 7/1995 |
| EP | 2008867 A1 | 12/2008 |
| EP | 2253508 A1 | 11/2010 |
| GB | 986255 A | 3/1965 |
| GB | 1582410 A | 1/1981 |
| GB | 2385396 A | 8/2003 |
| GB | 2392962 A | 3/2004 |
| GB | 2402380 A | 12/2004 |
| GB | 2475684 A | 6/2011 |
| NZ | 533772 | 3/2005 |
| WO | 9629274 A1 | 9/1996 |
| WO | 9961209 A1 | 12/1999 |
| WO | 0009294 A1 | 2/2000 |
| WO | 2005011081 A2 | 2/2005 |
| WO | 2005090125 A1 | 9/2005 |
| WO | 2008067318 A2 | 6/2008 |
| WO | 2008127187 A1 | 10/2008 |
| WO | 2009113873 A1 | 9/2009 |
| WO | 2011064567 A1 | 6/2011 |

OTHER PUBLICATIONS

NewZealand examination report dated Nov. 20, 2014 X.

* cited by examiner

SIDE-LOADING RATCHET DEVICE

CROSS-REFERENCE TO RELATED APPLICATIONS

This application is a 371 U.S. National Stage of International Application No. PCT/NZ2012/000165, filed Sep. 13, 2012. This application claims the benefit of U.S. Provisional Application No. 61/535,681, filed Sep. 16, 2011. The disclosures of the above applications are incorporated herein by reference.

FIELD OF THE INVENTION

The invention relates to a ratchet device and in particular a ratchet device for use in securing a load with a strap.

BACKGROUND

Ratchet devices are commonly used with straps for the purpose of securing a load onto a vehicle deck, floor or platform. Typically to secure a load, one end of the strap is anchored to a fixed point on one side of the deck, floor or platform with the balance of the strap being arranged over or around the load and passed to the other side of the deck, floor or platform where it is secured by the ratchet device. Alternatively, one end of the strap may be coupled to the load, with the other end of the strap secured by the ratchet device.

In the case of a truck, the end of the strap will typically be anchored to the deck or to a rub rail. The unanchored end of the strap is fed through the ratchet device by threading the strap through a spool of the device until it is held reasonably taut over the load. It can be difficult and time consuming to thread a length of strap longitudinally through the spool. Only once the unanchored end of the strap has been fed through the spool, can the ratchet mechanism of the device be engaged.

Generally the strap is pulled through the spool using one hand while the user attempts to keep sufficient tension on the anchored end of the strap with their other hand to maintain the strap taut. Similarly, when releasing the strap, sufficient tension must be maintained on the anchored end so the ratchet can unwind freely. This sometimes necessitates walking backwards from the vehicle or platform while holding the tensioned strap and may take some distance depending on the overall length of the strap engaged with the spool. Such movement is not ideal when working in confined spaces such as unloading bays or roads and may result in a person walking into a fixed object or an oncoming vehicle.

It is an object of at least preferred embodiments of the present invention to provide an improved ratchet device into which a strap can be quickly and easily loaded or unloaded, or to at least provide the public with a useful alternative.

SUMMARY OF THE INVENTION

In accordance with an aspect of the present invention, there is provided a ratchet device for a strap, the ratchet device comprising: a body having a side member; and a spool having a side rotatably supported by the side member and a ratchet wheel fixed thereto; wherein the body further comprises a member moveable between an open position in which the other side of the spool is exposed to enable a strap to be laterally loaded into the spool from the exposed side of the spool and laterally unloaded from the spool, and a closed position in which said lateral loading and unloading are prevented.

This arrangement enables the strap to be laterally loaded and unloaded, without having to feed the strap in its entirety from one end.

In an embodiment, the spool comprises a hub, and a slot extends into the hub from the exposed side of the spool so that the strap can be fed into the slot sideways. Preferably, the hub is configured such that the strap can be fed into the slot sideways without bending the strap across its width.

In an alternative embodiment, rather than having a slot extending into the hub of the spool from the exposed side, a retaining feature may be provided on the spool, so part of the strap can be inserted between the retaining feature and the hub for initial winding after being loaded in a lateral direction into the spool between the retaining feature and the hub from the exposed side of the spool. The retaining feature may be any suitable form, such as an arm that is fixed to the ratchet wheel and extends substantially parallel to the hub for example. In that embodiment, the hub may be substantially solid.

The hub of the spool may comprise a single integrally formed component comprising the hub and the ratchet wheel fixed thereto. Alternatively, the hub of the spool may comprise a plurality of separate hub components that are fixed relative to each other to rotate together relative to the body. In an embodiment, the hub of the spool comprises two separately formed hub components that form the slot therebetween.

In an embodiment, a rotatable spacer is rotatably mounted to the moveable member, and is configured to couple with said other side of the spool when the moveable member is in the closed position to support said other side of the spool, to minimise compression of the strap between the plurality of hub components under load. A portion of the rotatable spacer may be configured to engage in said slot. Alternatively, a cavity may be positioned at said other side of the spool proximate to the slot, and a portion of the rotatable spacer may be configured to engage said cavity. The rotatable spacer may also assist with preventing the moveable member from opening.

In an embodiment, a spacer housing is fixed to the moveable member, with the rotatable spacer rotatably mounted to the spacer housing.

In an embodiment, a biasing device is provided between the rotatable spacer and the moveable member or spacer housing, to maintain the rotatable spacer on a desired orientation to couple with the spool as the support member is moved to the closed position. Preferably, the biasing device comprises a spring washer.

In an embodiment, the spool comprises two ratchet wheels positioned at or adjacent the side of the spool that is rotatably supported by the side member of the body, the ratchet wheels configured to rotate with the spool. Preferably, one ratchet wheel is positioned on either side of the side member of the body.

The ratchet wheel(s) may be integrally formed with the remainder of the spool. Alternatively, the ratchet wheel(s) may be formed separately from the remainder of the spool and fixed to the hub of the spool to rotate together relative to the body. In the embodiment comprising two separately formed ratchet wheels wherein the hub of the spool comprises two separately formed components, the spool may further comprise a plurality of pins to hold the spool assembly together.

In an embodiment, the device further comprises a lock for locking the moveable member in the closed position. The device may comprise a resistance pawl mounted to the body to resist unwinding of the spool, wherein part of the resistance pawl forms part of the lock. The resistance pawl may be configured such that when the resistance pawl engages the ratchet wheel the lock is in a locking configuration, and when the resistance pawl is disengaged from the ratchet wheel the lock is in an unlocked configuration.

The resistance pawl is preferably biased into engagement with the ratchet wheel.

The device may comprise a ratchet drive arm to drive movement of the spool, wherein the ratchet drive arm is moveable relative to the body between a closed position and an unlocked position, and wherein the ratchet drive arm is configured to disengage the resistance pawl from engagement with the ratchet wheel, and thereby move the lock to the unlocking configuration, when the ratchet drive arm is moved to the unlocked position. The ratchet drive arm may comprise two tines separated by spacers and a ratchet drive pawl housed between the tines.

In an embodiment in which the spool comprises two ratchet wheels positioned at or adjacent the side of the spool that is rotatably supported by the side member of the body, wherein one ratchet wheel is positioned on either side of the side member of the body, one tine may be positioned adjacent each ratchet wheel, on a side of the respective ratchet wheel opposite the side member of the body.

The device may comprise a release member for disengaging the ratchet drive pawl from the ratchet wheel. In an embodiment, the ratchet drive arm can only be moved to the unlocked position when the ratchet drive pawl is released by the release member.

In an embodiment, the moveable member is configured as a support member and supports said other side of the spool when the moveable support member is in the closed position. The spool may have a rounded profile at said other side, to assist with moving the moveable support member to the closed position. The spool may comprise grooves for receiving part of the movable support member when in the closed position.

The body may comprise at least one guide for guiding movement of the moveable support member into the closed position. In an embodiment, the body comprises two spaced apart guides, with each guide supporting a respective portion of the moveable support member when in the closed position, to help minimise twisting of the spool in use.

The moveable member may be pivotably mounted to the body about an axis substantially parallel to a rotational axis of the spool member. Alternatively, the moveable member may be slidably mounted to the body. In a preferred embodiment, the moveable member is pivotably mounted to the body about an axis substantially perpendicular to a rotational axis of the spool.

In an embodiment, the ratchet device is portable and reusable.

In accordance with a second aspect of the present invention, there is provided the use of a ratchet device as outlined in relation to the first aspect above, to secure a load on a vehicle or platform. The vehicle could be any suitable type, such as a truck, boat, aircraft, or container for example. In an embodiment, the ratchet device is used with a strap to initially secure the load, and an additional like ratchet device is used to provide additional tension to the strap after the strap is in place.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The invention consists in the foregoing and also envisages constructions of which the following gives examples only.

BRIEF DESCRIPTION OF THE DRAWINGS

The invention will be more clearly understood from the following description of a preferred embodiment thereof, which is given by way of example only, with reference to the accompanying drawings, in which.

DETAILED DESCRIPTION

Figure 1:
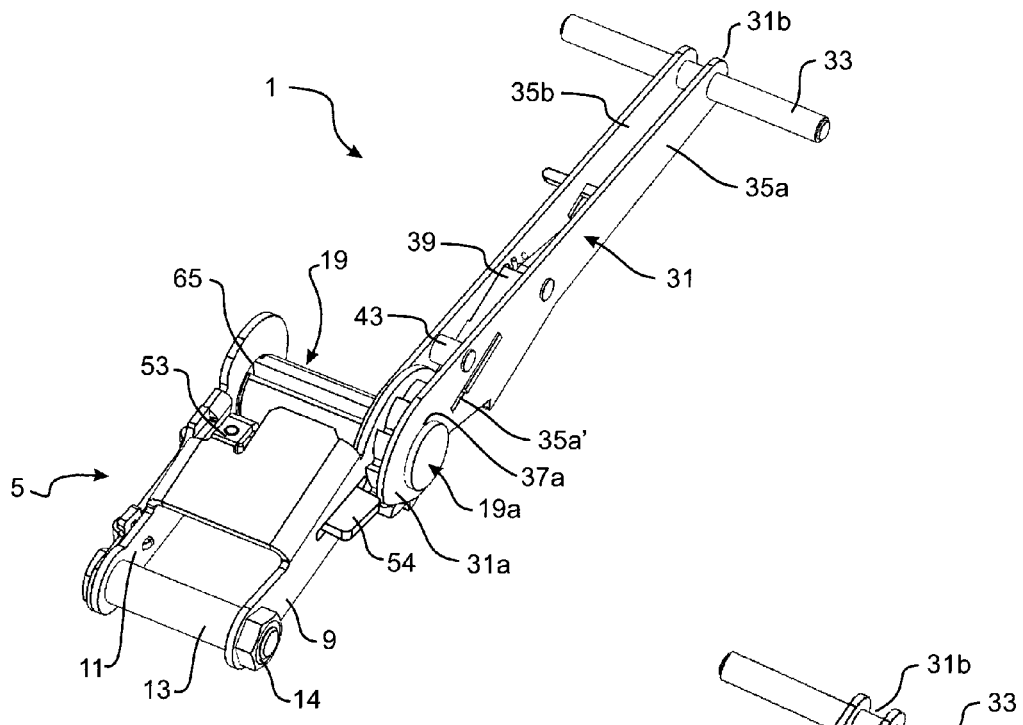
FIG. 1 is a perspective view from below of a load securement ratchet device in accordance with a first embodiment of the present invention, with the ratchet drive arm in an unlocked position.
Figure 2:
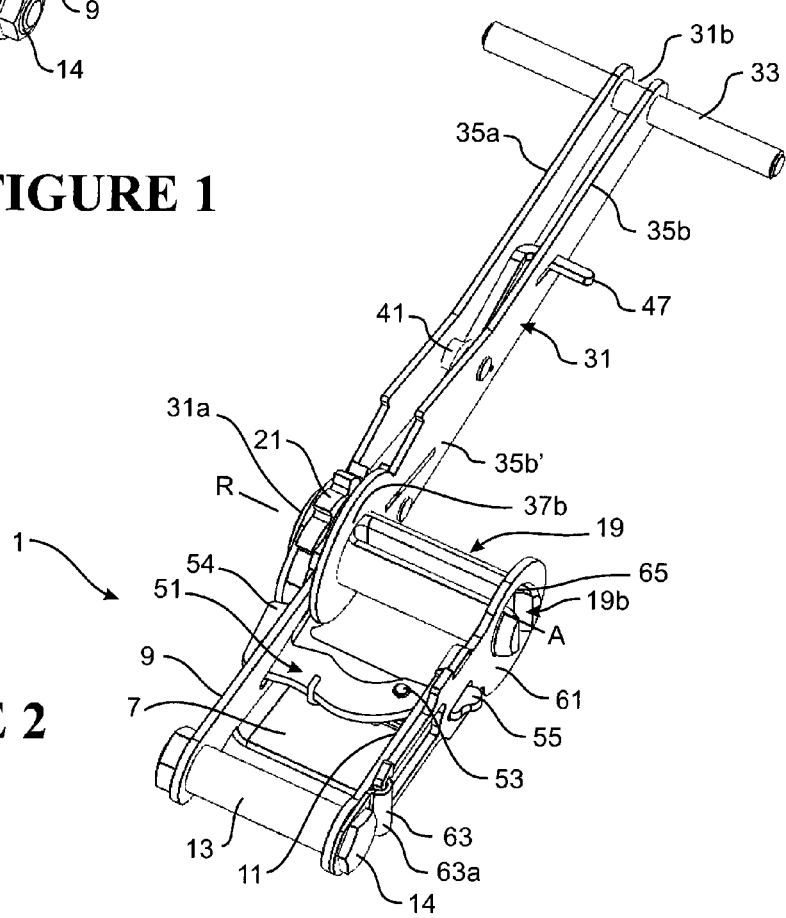
FIG. 2 is a perspective view from above of the ratchet device of FIG. 1.

Referring to FIGS. 1 to 14, there is illustrated a reusable side-loading load securement ratchet device according to a first embodiment the invention, indicated generally by the reference numeral 1. The ratchet device is suitable for use in tightening a strap to secure a load. Such a strap, in general, is arranged over or around the load to be secured before being tightened at one end by means of the ratchet device. Alternatively, an end of the strap can be secured to the load and the other end of the strap tightened by means of the ratchet device. In yet another alternative, the ratchet device may be attached to the load to be secured, and one end of a strap connected to an anchor point, with that other end of the strap tightened by the ratchet device.

The strap could be any type of strap, strop, or other flexible elongate member that is suitable for supporting the load in combination with the ratchet device, such as a tie-down strap for example. The strap will typically, although not always, have a widthwise dimension that is larger than its depth dimension.

Preferably, the ratchet device and strap will be suitable for securing an industrial load such as equipment being transported on a vehicle or platform, for example.

The ratchet device 1 comprises a body 5 having a base 7 and a pair of oppositely disposed side members 9 and 11 extending upwardly from the base. A transverse member 13, which in the form shown comprises a sleeve, extends between the side members 9, 11. The transverse member 13 acts as a support to receive a strap element or other device for coupling the body of the ratchet device to a support. As shown in FIGS. 9-14, a strap element 15 is secured to the transverse member 13. In the form shown, the strap element 15 is typically of short length and includes a coupling 17, such as a hook or catch, at its free end for coupling the ratchet device to a rail or load anchor (not shown) of a securing deck or platform (also not shown). An example of a suitable load anchor is described in U.S. Pat. No. 7,811,036. The contents of that specification are incorporated herein in their entirety by way of reference, and that specification shows and describes just one of the environments that would be suitable for use of the device of the present invention. The strap element could have any other suitable configuration. A hook member may be provided on, or instead of coupling 17 to couple the strap element 15 to the load anchor.

As another alternative, part of the body may be secured directly to an anchor point on a vehicle or platform, and strap element 15 and coupling 17 may not be used.

A spool 19 is rotatably mounted on the body 5 through an aperture in the side member 9. The spool 19 is rotatable relative to the body 5 about a rotation axis RA. The spool 19 has a ratchet wheel 21 fixedly attached at or toward one side 19a, and two hub portions 23a, 23b extending therefrom. The ratchet wheel has angled teeth that are suitable for driving by a drive pawl in one direction, but which enable the drive pawl to pass over the teeth in the opposite direction.

A slot 25 is defined between the two hub portions 23a, 23b, with the slot 25 being coaxial with the axis of rotation RA of the spool so as to extend partly across the middle of the spool. The slot is open to the side 19b of the spool opposite to the ratchet wheel, and extends into the spool for about 80% of the width of the spool. The slot is for receipt of part of a strap element to be tightened, as will be described below.

Each hub portion 23a, 23b has an arcuate slot 27a, 27b provided adjacent its end opposite the ratchet wheel. The end 29a, 29b of each hub portion opposite the ratchet wheel is rounded, so that side 19b of the spool has a rounded profile.

Figure 12:
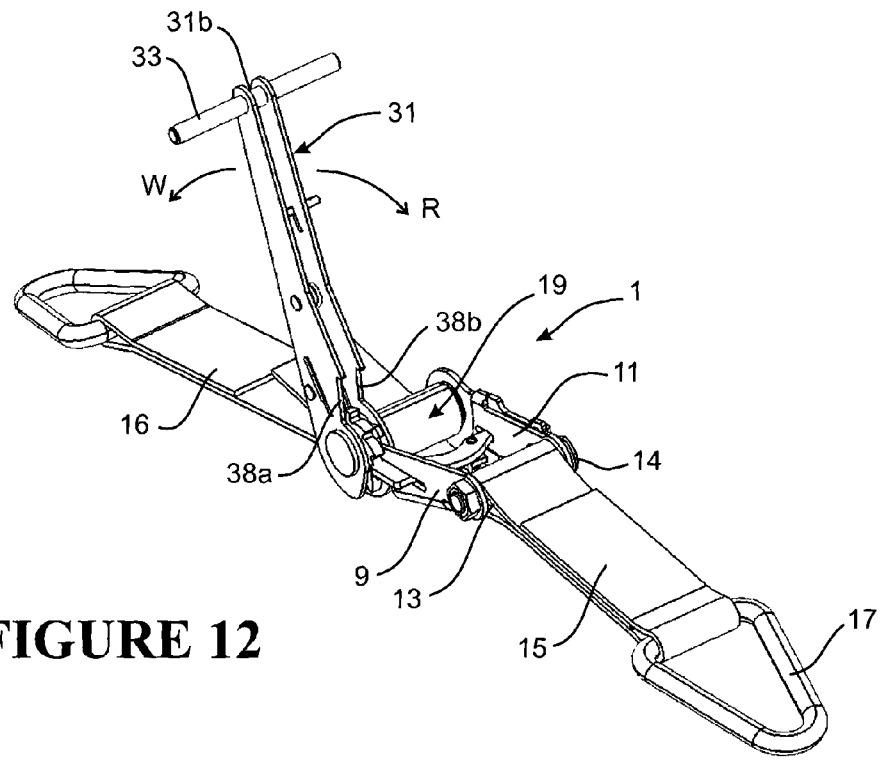
FIG. 12 is a perspective view from above with the ratchet drive arm being used to wind the strap on the spool, showing the strap partly wound on the spool.

The ratchet device 1 also includes a ratchet drive arm 31 with a proximal end 31a that is rotatably coupled about the ratchet wheel 21 of the spool. The drive arm is moveable relative to the body between a fully open unlocked position (e.g. FIG. 1) in which a drive pawl 39 on the drive arm does not engage the ratchet wheel 21 and in which the drive arm extends from the body, and a closed position (e.g. FIG. 3) in which the drive pawl 39 on the drive arm engages the ratchet wheel 21 and in which the drive arm is positioned adjacent the body. The drive arm 31 is also moveable between a plurality of intermediate positions in which the drive pawl engages the ratchet wheel, one of which is shown in FIG. 12.

A distal end 31b of the drive arm 31 has a transverse member 33 that acts as a handle for grasping by a user. The drive arm 31 has a pair of spaced apart tines 35a, 35b that form a main body of the drive arm. The handle 33 may extend from both sides of the main body of the drive arm, to minimise any twisting of the ratchet wheel by the handle. Tines 35a, 35b have coaxial apertures 37a, 37b and recesses 38a and 38b. The side 19a of the spool extends through the aperture 37a in the plate 35a, and the hub portions 23a, 23b of the spool extend through aperture 37b in the plate 35b. The ratchet wheel 21 of the spool 19 is positioned between the two tines 35a, 35b of the drive arm. Part of the side member 9 is positioned between the ratchet wheel 21 and the plate 35b, with the hub portions 23a, 23b of the spool extending through the aperture in the side member 9 to rotatably mount the spool to the body.

Figure 5:
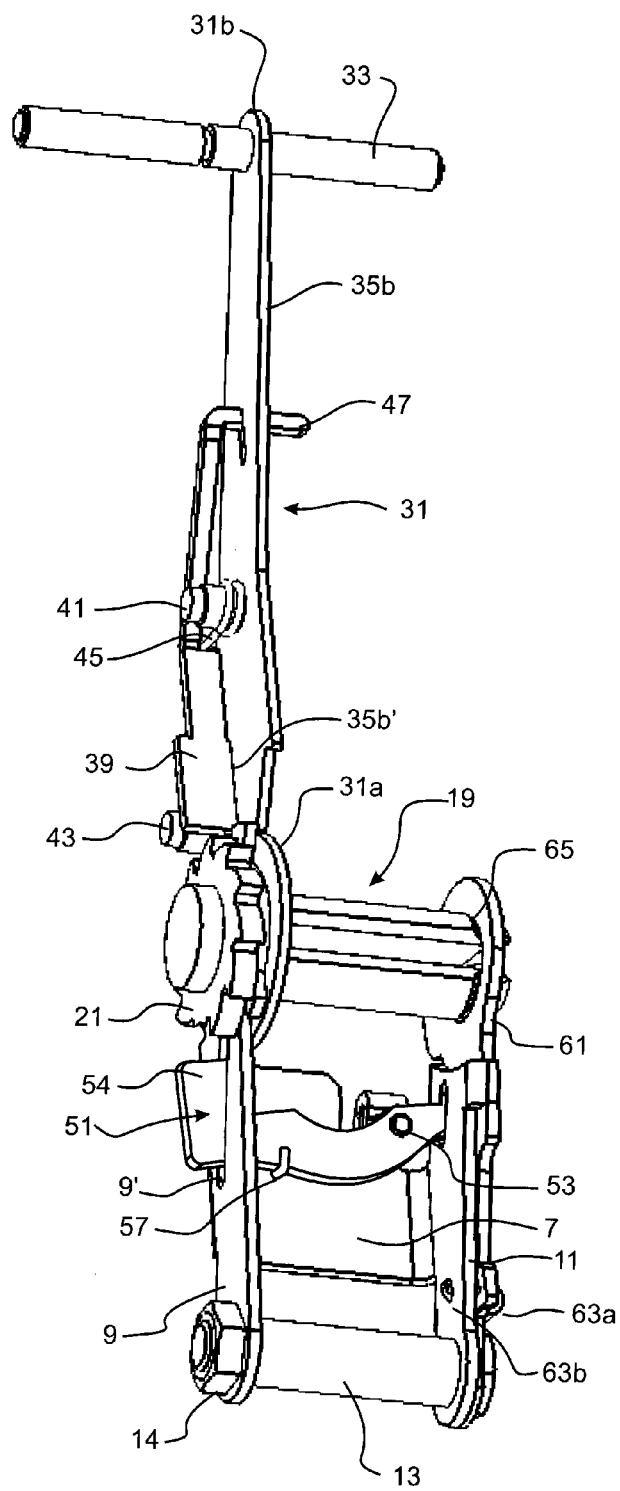
FIG. 5 is a perspective view from above of the ratchet device of FIG. 1, with one member of the ratchet drive arm not shown so the drive pawl is clearly visible.

As shown in FIG. 5, the drive arm 31 has a drive pawl 39 positioned between the tines 35a, 35b. The drive pawl 39 is adjustable relative to the tines 35a, 35b in the longitudinal direction of the drive arm. The end of the drive pawl 39 proximal the spool is slidably mounted in slots 35a', 35b' in the tines 35a, 35b. First 41 and second 43 spacers extend between the side tines 35a, 35b. A biasing device 45 which, in the form shown, is a torsion spring is mounted on the first spacer 41 and biases the drive pawl 39 into engagement with the ratchet wheel.

Figure 3:
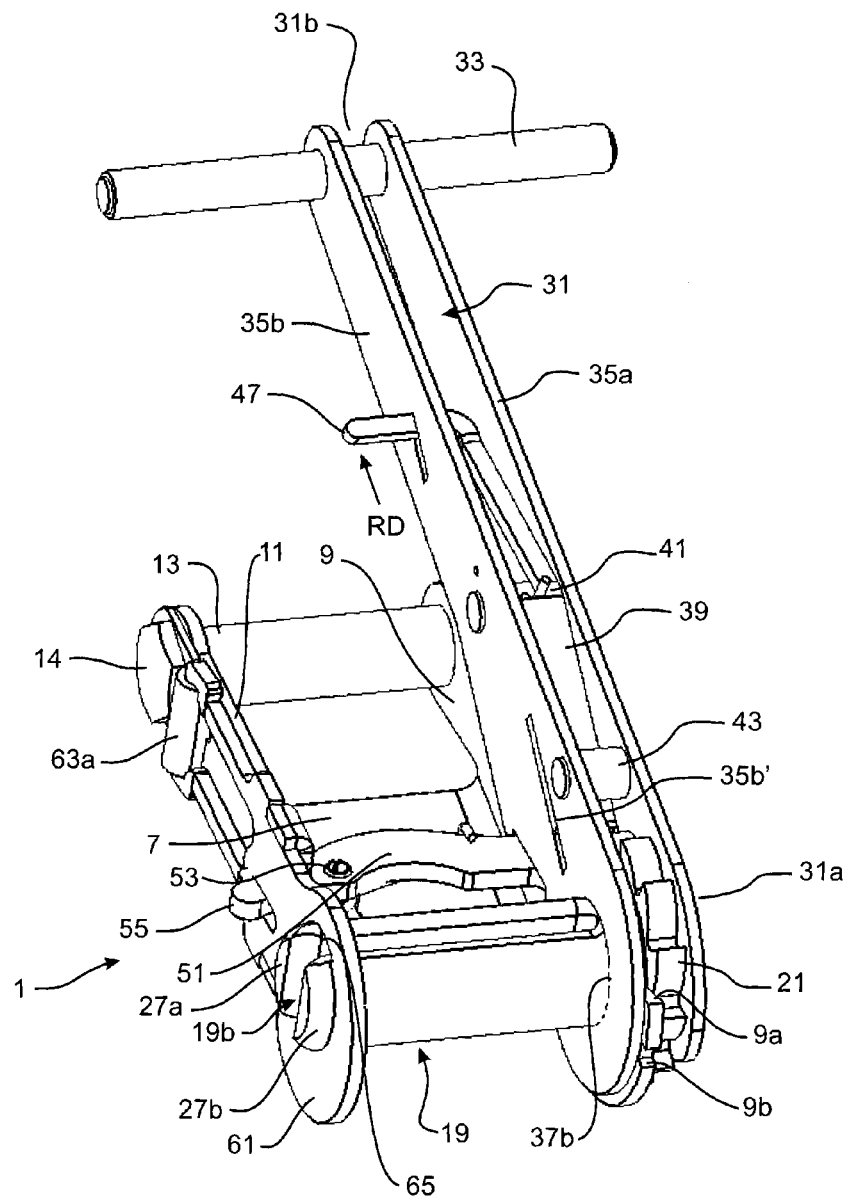
FIG. 3 is a perspective view from above of the ratchet device of FIG. 1, with the ratchet drive arm in a closed position.
Figure 4:
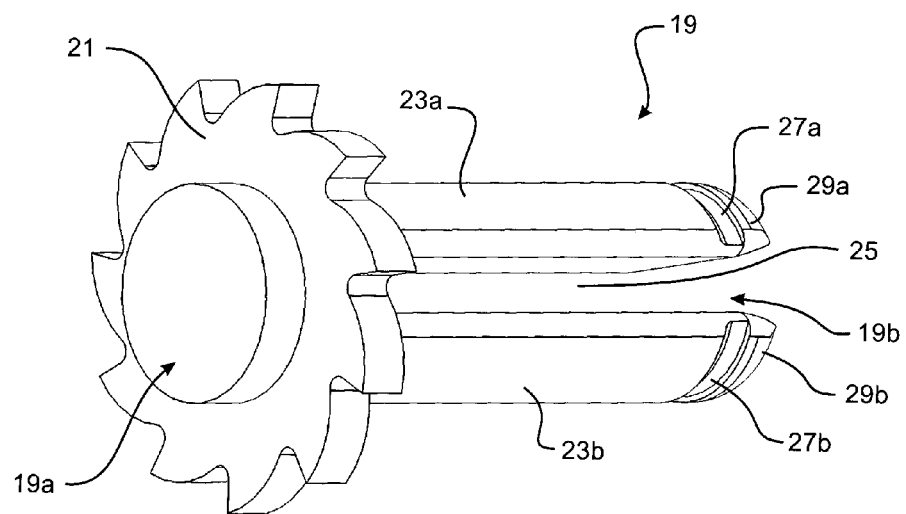
FIG. 4 is a perspective view of the spool of the ratchet device of FIG. 1.

A drive pawl release arrangement is provided which includes a transverse release lever 47 which is connected to or is part of the end of the drive pawl 39 distal the ratchet wheel and extends through a slot in the plate 35b of the body. As shown in FIG. 3, a user can pull the release lever 47 in a release direction RD away from the ratchet wheel 21 and toward the handle 33, to disengage the drive pawl from the ratchet wheel 21. When the user releases force from the release lever 47, the biasing device 45 will drive the drive pawl 39 back into engagement with the ratchet wheel 21.

A resistance pawl 51 is pivotably mounted to the base 7 of the body through a pivot pin 53. A ratchet wheel-engaging end 54 of the resistance pawl 51 extends through an elongate slot 9' of the side member 9 and is biased into engagement with the ratchet wheel 21 by a biasing device 57. In the form shown, the biasing device is a torsion spring. The drive arm 31 can be moved to and fro from the closed position of FIG. 3 and through the intermediate positions, without using the transverse release lever 47 to disengage the drive pawl 39. A stop 9a, shown in FIG. 3, is provided on side member 9. The stop 9a is contacted by the drive pawl 39 and prevents the drive arm from being moved beyond the outermost intermediate position to the unlocked position of FIG. 1. To move the drive arm 31 to the unlocked position of FIG. 1, the user must pull on release lever 47 so that the drive pawl 39 disengages from the ratchet wheel and clears the stop 9a.

Figure 7:
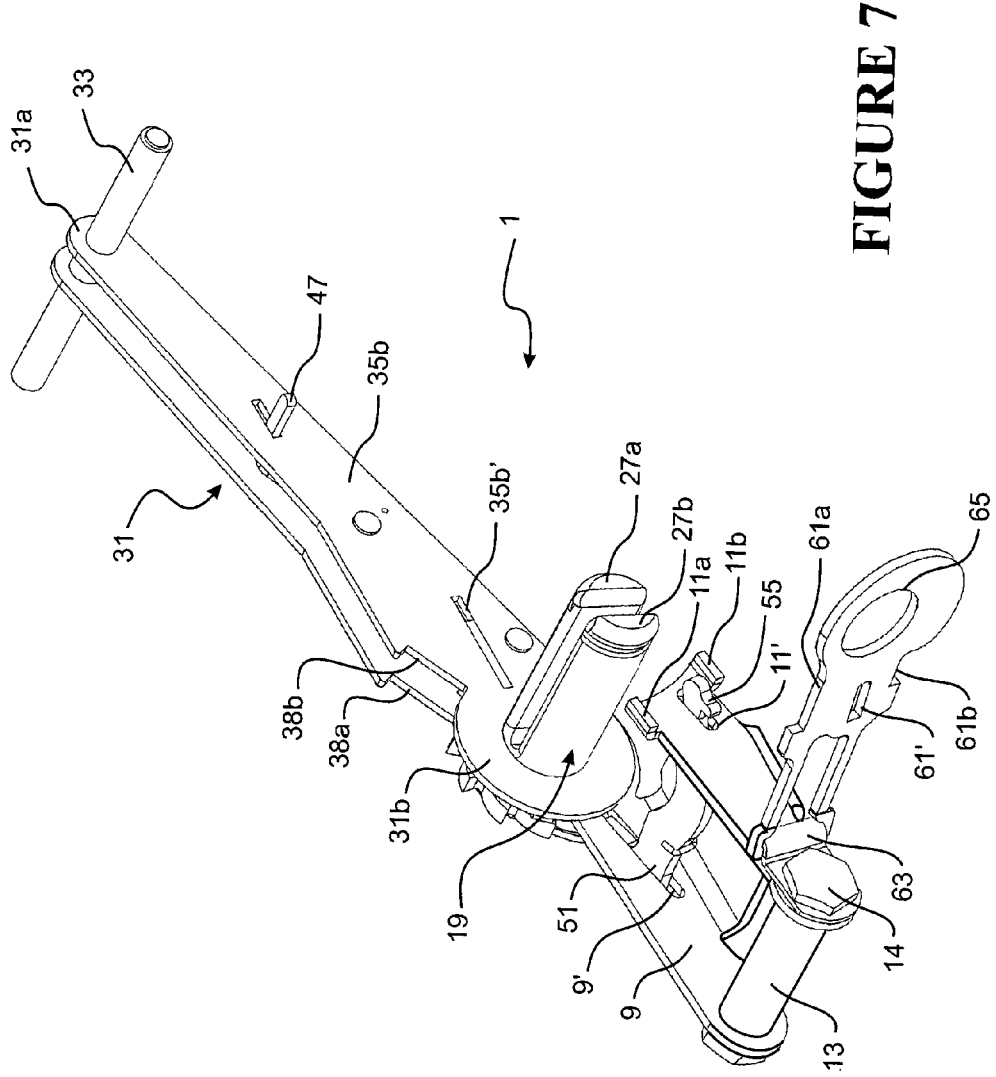
FIG. 7 is a perspective view from above of the ratchet device of FIG. 1, with the support member in an open position so a strap can be laterally loaded into the spool from an exposed side of the spool.
Figure 8:
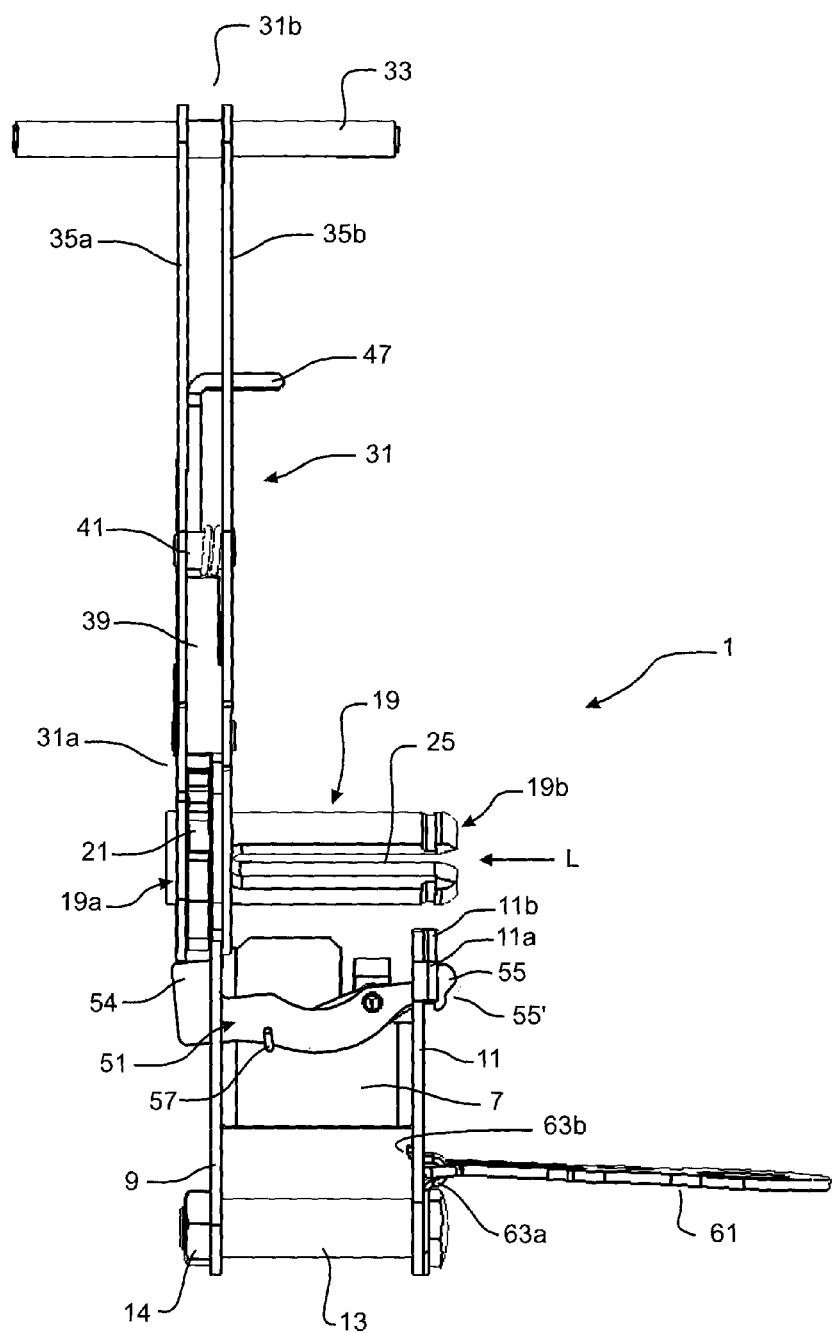
FIG. 8 is a plan view from above of the ratchet device in the configuration of FIG. 7.
Figure 9:
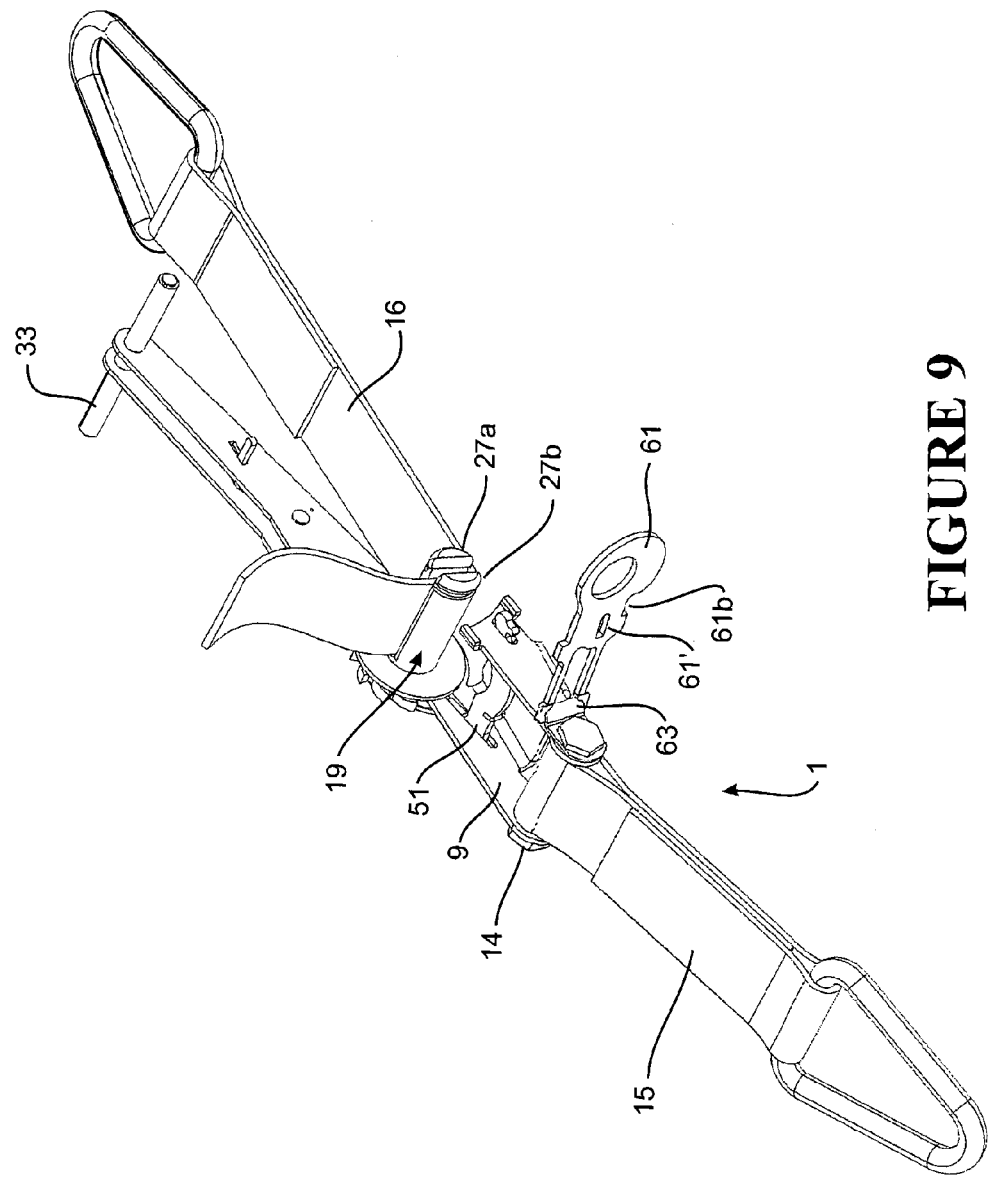
FIG. 9 is a perspective view from above of the ratchet device in the configuration of FIG. 7, showing the initial loading of the strap into the spool.
Figure 10:
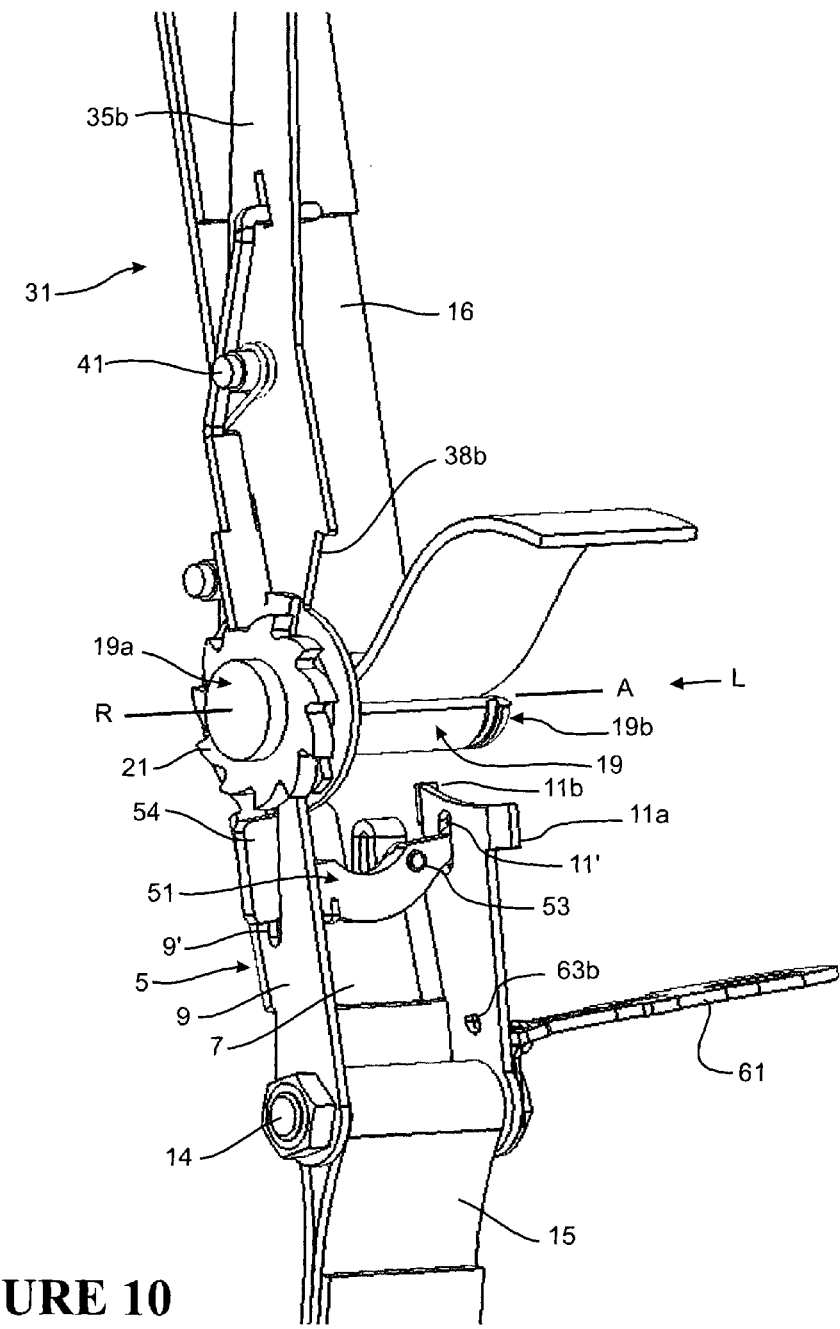
FIG. 10 is another perspective view from above of the ratchet device in the initial loading configuration of FIG. 9, with one member of the ratchet drive arm not shown so the drive pawl is clearly visible.

As can be seen most clearly in FIG. 7, side member 11 of the body is shorter than side member 9. Side member 11 terminates at a position short of the spool hub portions 23a, 23b. The side member has upper and lower guide elements 11a, 11b at or adjacent its free end, with the guide elements projecting in a direction opposite to side member 9. The side member 11 also has an elongate slot 11' positioned adjacent its free end.

A moveable member comprises an arm 61 that is pivotally mounted to the body 5 through a hinge 63. The hinge 63 is secured to side member 11 by a bolt 14 that extends through the transverse sleeve 13. The hinge comprises a plate held by the bolt, which plate has an arcuate portion 63a to receive part of the moveable arm. A portion of the plate opposite to the bolt end of the plate has a projection 63b that extends into an aperture in the body. The projection 63b keys the plate and thereby the pivot axis of the moveable arm 61 to the body, so the moveable arm remains in a correct alignment.

Preferably, the moveable arm 61 is configured as a support arm, and is moveable between a closed position (shown in FIGS. 1-3 for example) in which it supports side 19b of the spool 19 and an open position (shown in FIGS. 7-10 for example) in which the same side 19b of the spool 19 is exposed to allow the strap 16 to be laterally loaded into the spool from the exposed side 19b of the spool. The moveable support arm 61 together with side member 11 form a side of the body opposite to side member 9.

An end of the moveable support arm 61 opposite to the hinge 63 has an aperture 65 through which the side 19b of the spool 19 is received when the moveable support arm 61 is in the closed position. The rounded profile at the exposed side 19b of the spool 19 facilitates easy movement of the side 19b of the spool through the aperture 65 as the moveable support arm 61 is moved to the closed position.

The arcuate slots 27a, 27b in the hub portions 23a, 23b form a substantially annular recess in which an edge of the aperture 65 of the moveable support arm 61 sits when in the closed position. When the moveable support arm 61 is moved to the closed position, an edge of the aperture 65 of the moveable support arm will be positioned at least in the recess 27a of the hub portion 23b that is positioned furthest from the pivot of the moveable support arm 61. The edge of the aperture 65 preferably clicks into engagement with the recess 27a as the moveable support arm is moved to the closed position. As the spool is rotated, the recesses on the other hub portion 23b will move into contact with the edge of the aperture spaced furthest from the pivot of the moveable support arm 61. The moveable support arm thereby applies a pulling force on end 19b of the spool toward the transverse member 13 of the body, to stabilise and support the spool in use.

In an alternative configuration, the moveable support arm 61 may interact with end 19b of the spool to apply a pushing force on the end 19b of the spool in a direction away from the transverse member 13 of the body, when the moveable support arm 61 is in the closed position. In yet another configuration, both recesses 27a, 27b of the hub portions 23a, 23b of the spool engage with the aperture 65 of the moveable support arm concurrently, when the moveable support arm is in the closed position. In yet another configuration, the moveable support arm 61 may be a relatively loose fit with the end 19b of the spool, so as to substantially prevent the spool from twisting when the spool is being used to wind a strap element onto the spool. In an alternative configuration, the moveable arm or member may not physically engage with the end 19b of the spool but may be positioned immediately adjacent the end 19b of the spool when in the closed position, to prevent the strap being removed in a lateral direction from the spool.

The upper and lower guide elements 11a, 11b guide movement of the moveable support arm 61 into the closed position. The support arm 61 has upper and lower recesses 61a, 61b that receive the guide elements. The guide elements 11a, 11b also help to restrict movement of the support arm 61 when in the closed position and the ratchet device is in use, to take loading and support the side 19b of the spool and prevent twisting of the spool relative to the body in use.

The device 1 also has a lock for locking the moveable support arm in the closed position. The end of the resistance pawl 51 opposite to the ratchet wheel-engaging end 54 comprises a locking member 55 which is generally hook shaped and extends through a slot 11' in the side member 11 and a slot 61' in the moveable support arm 61 which aligns with the slot 11' when the moveable support arm 61 is in the closed position against the side member 11. The hook 55 is oriented in a direction toward the hinge 63, and is biased in that direction as a result of the configuration of the pivot 53 and spring 57 acting on the resistance pawl. The hook shaped locking end 55 of the resistance pawl 51 locks the moveable support arm 61 in the closed position when the resistance pawl 51 is engaged, and unlocks the moveable support arm 61 when the resistance pawl 51 is disengaged.

The recesses 38a, 38b of the ratchet drive arm 31 abut against the ratchet wheel-engaging end 54 of the resistance pawl 51 when the ratchet drive arm 31 is in the closed position.

This prevents the resistance pawl 51 from being disengaged from the ratchet wheel. Thus, the hook shaped locking member 55 cannot be unlocked to release the moveable support arm 61 when the ratchet drive arm 31 is in the closed position shown in FIG. 3, because part of resistance pawl 51 will be positioned in recesses 38a, 38b. This is the position that the ratchet device will be placed in once the load is secured (such as during transport of the load).

When the drive arm 31 has been moved outwardly from the position shown in FIG. 3 to one of the intermediate positions, the recesses 38a, 38b will clear the resistance pawl 51. The user can then, if they wish, manually apply force to the resistance pawl 51 against the spring bias, so that the resistance pawl 51 disengages the ratchet wheel and the locking member 55 moves to the unlocked position. That unlocks the moveable support arm 61, to expose end 19b of the spool so the spool can be loaded or unloaded from the side.

Figure 6:
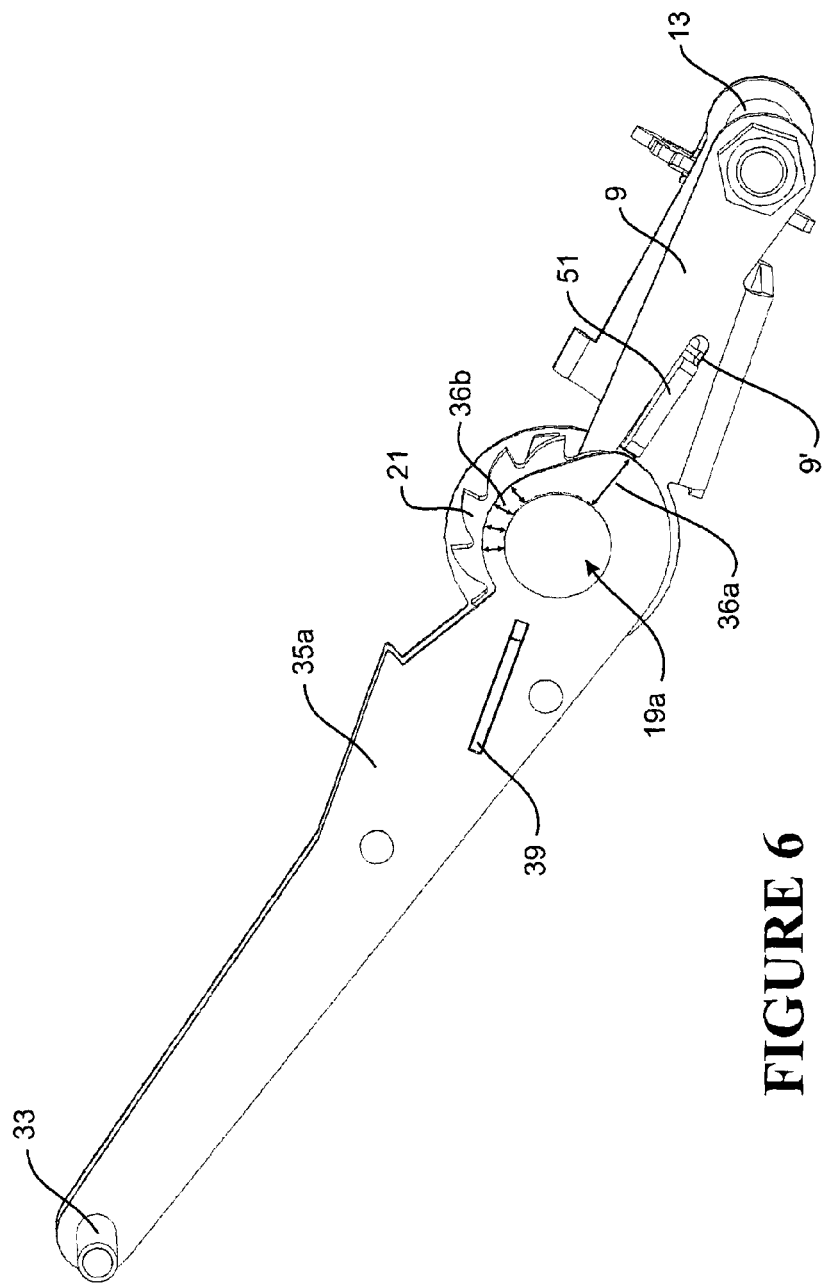
FIG. 6 is a side perspective view of the ratchet device of FIG. 1, showing an eccentric portion on the ratchet drive arm to disengage the resistance pawl and release a support member lock.

The user need not apply manual force to the resistance pawl 51 in the manner described above to unlock the moveable support arm 61. As can be seen in FIG. 6 for example, at least one of the tines 35a, 35b of the drive arm 31 is provided with an eccentric portion 36a that pushes ratchet wheel-engaging end 54 of the resistance pawl 51 out of engagement with the ratchet wheel 21 against the spring bias when the drive arm 31 is in the unlocked position. It can be seen from FIG. 6 that the tine 35a has a region around the aperture housing end 19a of the spool that has a relatively small constant dimension 36b. That region engages with the ratchet wheel in the closed and intermediate positions of the drive arm 31. In each of those positions, the resistance pawl 51 will be engaged with the ratchet wheel 21, unless the user manually applies force to the resistance pawl 51 to disengage the resistance pawl from the ratchet wheel.

Eccentric portion 36a has a larger dimension than region 36b. Because the resistance pawl 51 is pivoted to the body, when the drive arm 31 is moved to the unlocked position to disengage the resistance pawl 51 from the ratchet wheel 21, that movement automatically causes the locking member 55 of the resistance pawl to move to the unlocked position from its locking position so the moveable support arm 61 can be opened. Preferably, the drive pawl 39 engages with a notch 9b (FIG. 3) in side member 9 when the drive arm 31 is in the unlocked position, so that the user needs to pull on transverse release lever 47 to move the drive arm 31 back into the closed position or one of the intermediate positions.

The outer surface 55' of the hook member 55 is curved and angled so that if the resistance pawl 51 is not being physically moved against the bias of the spring 57 into the disengaged position when the moveable support arm 61 is being closed, the moveable support arm will override the spring 57 and temporarily move the hook member 55. The spring 57 will then bias the hook member 55 to lock the support member 61 in the closed position.

The ratchet device 1 will now be described in use with reference to FIG. 25.

The strap 15 will be connected to the transverse member 13 of the body 5, and the coupling 17 will be coupled to a suitable anchor point such as a load anchor on a vehicle V. The other strap 16 will initially be separate from the ratchet device 1, and its coupling 18 will be coupled to a suitable support member on the other side of a load to be secured, such as a load anchor on a vehicle. A hook member may be provided on, or in place of, coupling 18. The balance of the strap 16 will be arranged over or around the load to be secured by the ratchet device 1. Alternatively, one of the straps can be connected to the load to be secured. The user will move the ratchet device into the position shown in FIG. 7 by pulling on lever 47 and moving the drive arm 31 outwardly to the unlocked position, which will cause the resistance pawl 51 to disengage from the ratchet wheel and unlock the moveable support arm 61, which enables the moveable support arm 61 to be moved to the open position.

A portion of strap 16 is then loaded in a lateral direction L which corresponds to a widthwise direction of the strap into the spool 19 from its exposed side 19b. Because the slot 25 of the spool 19 is open to the exposed side of the spool, the strap can be fed into the slot 25 laterally without having to feed the strap in its entirety from one end or bending the strap across its width.

Figure 11:
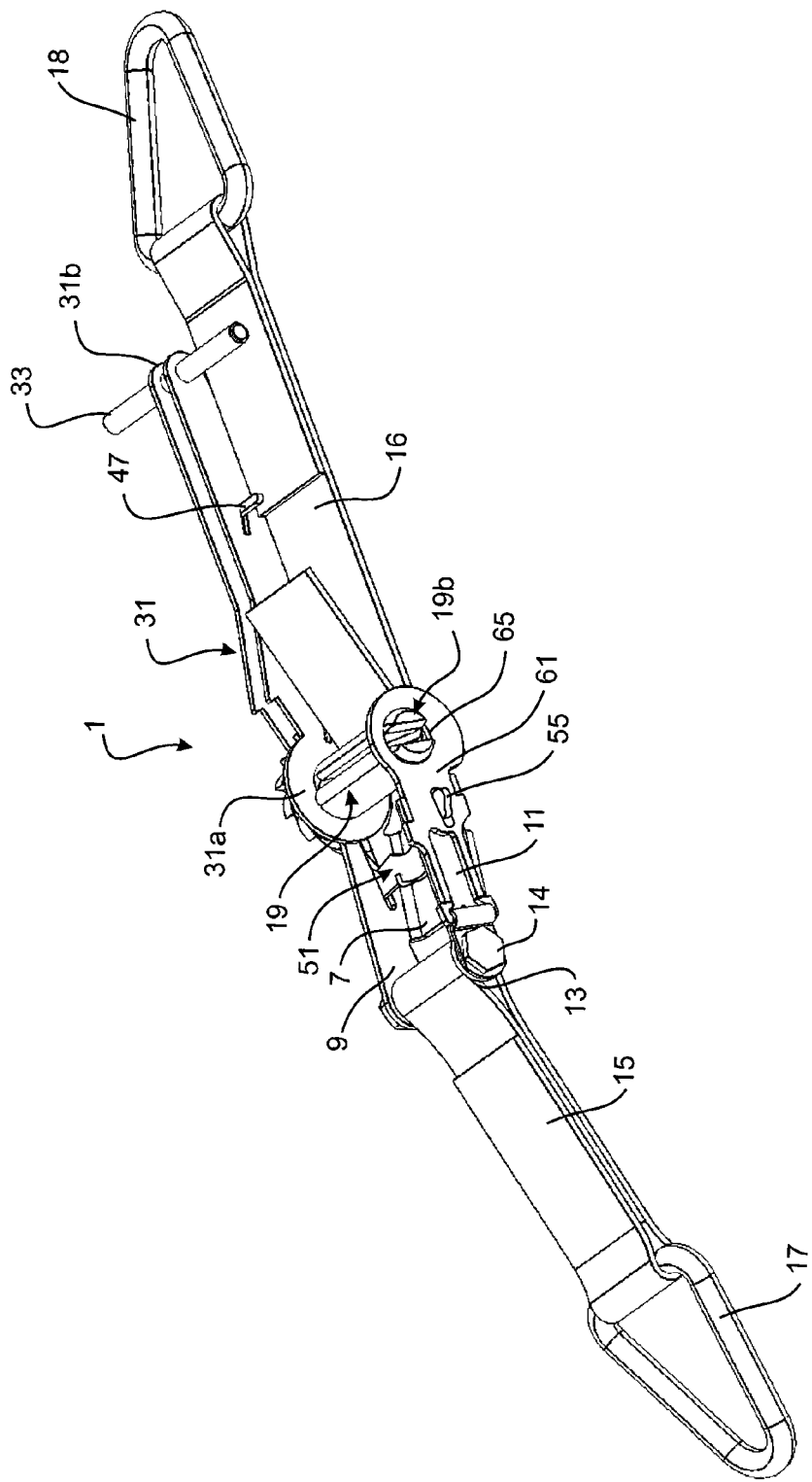
FIG. 11 is a perspective view from above after initial loading of the strap into the ratchet device, and with the support member in a closed position to support the side of the spool.

The moveable support arm 61 is then returned to the closed position. The user will then pull on release lever 47 so the drive pawl 39 will clear the notch 9b in the side member 9 of the body, to enable the drive arm 31 to be returned to the closed position or one of the intermediate positions. As the drive arm is moved from the unlocked position, the spring bias on the resistance pawl 51 will cause the resistance pawl to reengage with the ratchet wheel 21 and the locking member 55 to return to the locking position. The locking member 55 locks the moveable support arm 61 in the closed position, as shown in FIG. 11. The closed moveable support arm 61 prevents the strap from either falling out of the slot 25 and/or off the side 19b of the spool 19 when there is little or no tension on the strap 16.

Figure 13:
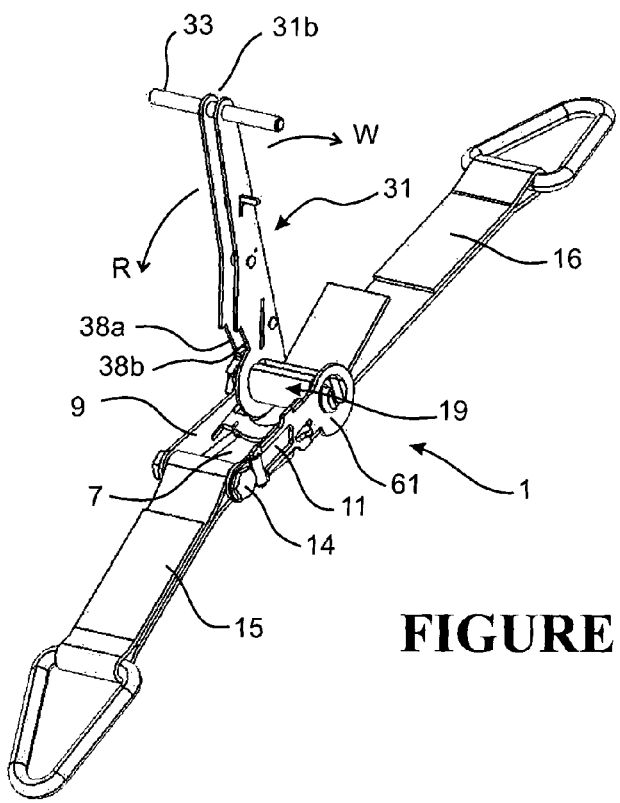
FIG. 13 is a perspective view from above corresponding to FIG. 12, but from the other side.
Figure 14:
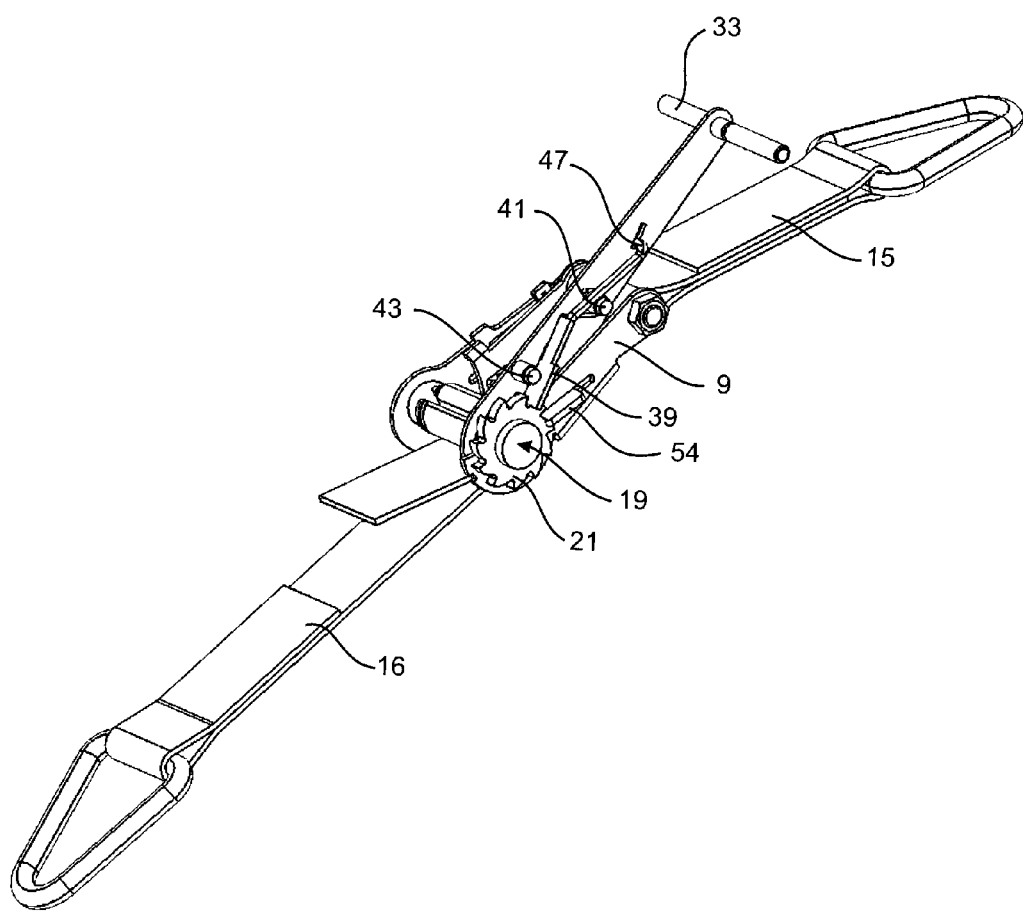
FIG. 14 is a perspective view from above similar to FIG. 13, but with one tine of the ratchet drive arm removed to show the drive pawl engaged with the ratchet wheel.

As shown in FIGS. 12 and 13, the strap 16 can then be wound onto the spool 19 by moving the drive arm 31 to and fro between the closed and intermediate positions, in a winding direction W in which the drive pawl 39 causes the spool to turn and wind the strap 16 onto the spool, and a ratcheting direction R in which the drive pawl passes over the teeth of the stationary ratchet wheel 21. When the drive pawl 39 rotates the spool when the drive arm 31 is being moved in the winding direction W, the resistance pawl 51 passes over the moving teeth of the turning ratchet wheel 21. When the drive pawl passes over the teeth of the stationary ratchet wheel when the drive arm 31 is being moved in the ratcheting direction R, the resistance pawl 51 resists movement of the ratchet wheel to stop it unwinding and releasing tension on the strap 16.

Figure 25:
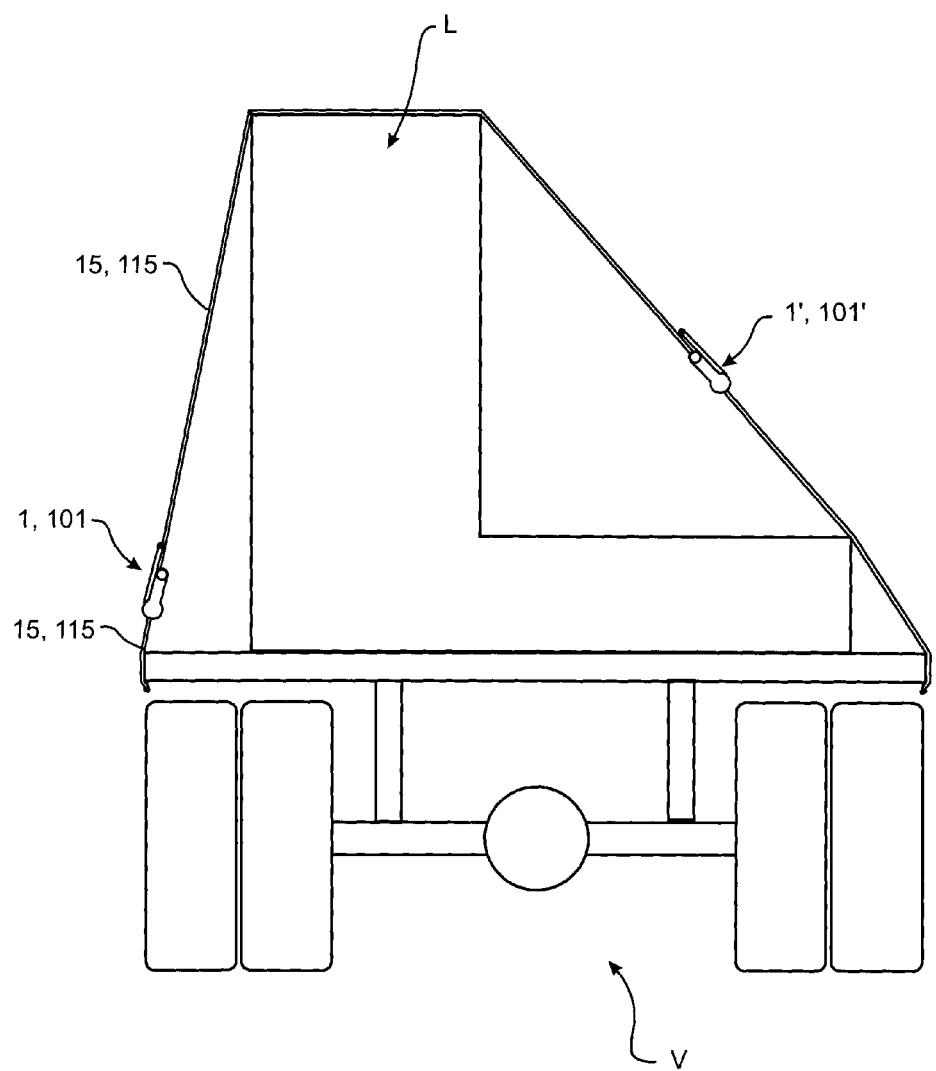
FIG. 25 is a view of the ratchet device of FIG. 1 in use in accordance with one embodiment of the present invention.

FIG. 25 shows a second like ratchet device 1' being used to tension the longer portion of strap 16 on the right side of the load. The load L will initially be secured by the left side ratchet device 1 and the straps 15, 16 that couple the ratchet device 1 to the left and right sides of the vehicle V. However, the longer strap portion on the right side of the load will have less tension than the shorter strap portion on the left side of the load. To provide additional tension to the longer strap portion that is already in place, the longer strap portion will be inserted laterally into the spool of a second ratchet device 1', and the longer strap portion will be wound around the spool of the second ratchet device 1' and tensioned in the same manner described above. The second ratchet device 1' need not be separately coupled to the vehicle or load; instead, it can just act as an extra tensioning device on the existing strap.

The ratchet device(s) remain(s) in position with the straps 15, 16 throughout the duration the load is tensioned, for example during transporting the load on a vehicle between locations.

When the user wishes to release the load, they initially pull lever 47 toward the handle 33 to disengage drive pawl 39 from the ratchet wheel 21 and move the drive arm 31 to the unlocked position shown in FIG. 11 for example. That again causes the ratchet wheel engaging end 54 of the resistance pawl 51 to disengage from the ratchet wheel 21 and concurrently releases the locking member 55 from engagement with the moveable support arm 61, so the support arm 61 can be moved to the open position. Releasing the ratchet wheel-engaging portion 54 from the ratchet wheel 51 will release the tension in the strap 16 by allowing the strap to partially unwind from the spool. Once the tension has been released, the part of the strap that is still wound around the spool 19 can be removed by sliding it in a lateral direction opposite to direction L, without needing the strap to be fully unwound or fed longitudinally out of the spool. The second ratchet device 1' would typically be released before the first ratchet device 1.

The ratchet device can then be reused in the manner described. The device is preferably portable, so that the device can readily be moved to secure a different load or the same load on a different vehicle or platform.

FIGS. 15-24 illustrate a reusable side-loading load securement ratchet device according to a second embodiment the invention, indicated generally by the reference numeral 101. Unless described below, the features, functioning, and uses of this embodiment are the same as for the first embodiment described in relation to FIG. 1-14, and like reference numerals indicate like parts with the addition of 100.

In the first embodiment described above, the spool 19 is a one-piece integrally formed device, with the ratchet wheel 21 also integrally formed with the remainder of the spool. In this second embodiment, the two hub portions of the hub are formed as separate components 123a, 123b that are fixed relative to each other in use to rotate relative to the body. The hub components are preferably identical for ease of manufacture.

Rather than having a single ratchet wheel 21, in this embodiment the spool comprises two ratchet wheels 121a, 121b. The ratchet wheels 121a, 121b may both be positioned on one side of the side member 109. Preferably, however, the ratchet wheels 121a, 121b are spaced apart along the axis of rotation of the spool. The ratchet wheels are positioned at or adjacent the side 119a of the spool that is rotatably supported by the side member 109 of the body. The spacing between the two ratchet wheels 121a, 121b is sized and configured for receipt of the side member 109 of the body 105, and one ratchet wheel is positioned on either side of the side member 109. If ratchet wheel(s) were only positioned on one side of the side member 109, the ratchet wheel(s) could apply a bending load on the resistance pawl 156. By placing the ratchet wheels on either side of the side member 109, the bending load is avoided as loading is applied substantially equally on the resistance pawl 151 on either side of the side member 109 of the body. The ratchet wheels 121a, 121b are positioned inside respective tines 135a, 135b of the drive arm 131.

Figure 22:
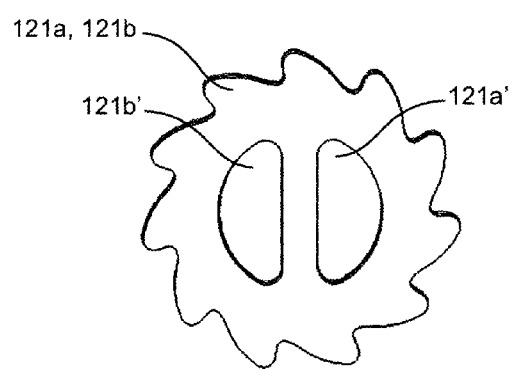
FIG. 22 is a view of one of the ratchet wheels of the spool of FIG. 19.

Each ratchet wheel comprises two recesses 121a', 121 that correspond in size and shape to the outer surface of the hub components 123a, 123b, as shown in FIG. 22.

The spool 119 also comprises a plurality of pins 122a, 122b. A first pin 122a is spaced apart from the first ratchet wheel 121a, and is positioned adjacent the first side 119a of the spool. The spacing between the pin and the ratchet wheel 121a is sized and configured for receipt of the tine 135a of the drive arm. A second pin 122b is positioned adjacent the second ratchet wheel 121b, on the side of the ratchet wheel 121b toward the side 119b of the spool.

To assemble the spool 109 and mount the spool to the body 105, initially the two ratchet wheels 121a, 121b are positioned on either side of the side member 109 of the body. The drive arm 131 is placed in position with its tines 135a, 135b on either side of the ratchet wheels. The inner pin 122b is positioned through the hub components 123a, 123b, and the end 119a of the hub components is inserted through the drive arm 131, ratchet wheels 121a, 121b, and side member 109. When in position, the inner pin 122b fits closely within the aperture in the drive arm 131, and/or side member 109, so the pin cannot be removed. The other pin 122a, which has a tortuous shape to prevent inadvertent removal, is inserted through apertures in the two hub components 123a, 123b outside the outer tine 135a of the drive arm, to hold the assembly together. A washer (not shown) may be positioned between the outer tine 135a and the pin 122a. The spool 119 comprising the hub components 123a, 123b, ratchet wheels 121a, 121b, and pins 122a, 122b are fixed together to rotate as a unit relative to the body 105.

Figure 20:
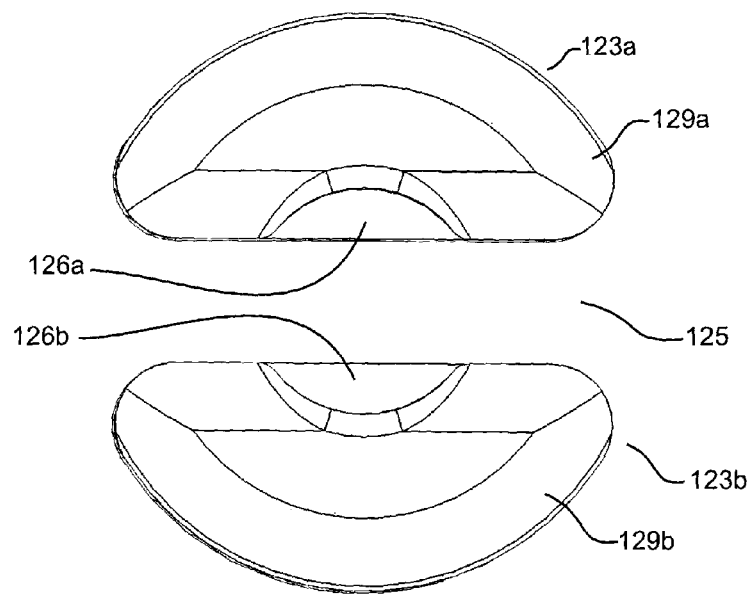
FIG. 20 is a side view of part of the two-part hub of the spool of FIG. 19 showing a cavity for coupling with a rotatable spacer.
Figure 21:
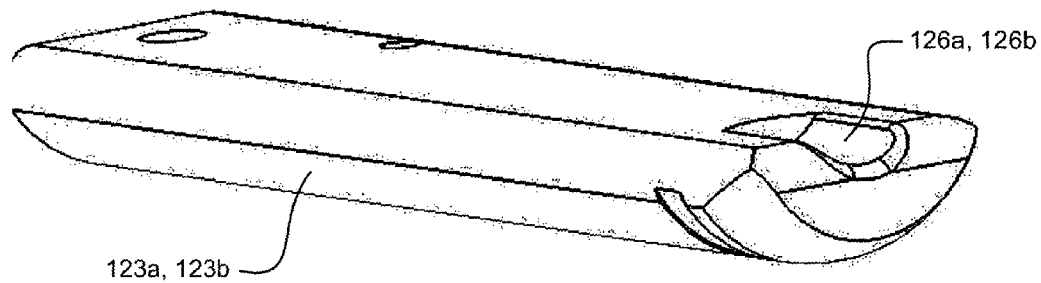
FIG. 21 is a view of one hub component of the two-part hub of FIG. 20, showing a respective portion of the cavity.

As shown in FIGS. 20 and 21, the exposed end 119b of the spool 119 comprises a cavity proximate to the slot 125. The cavity is formed by two cavity portions 126a, 126b ending into the exposed ends of the hub components 123a, 123b, in faces of the components that are adjacent the slot 125. The cavity 126a, 126b engages with a rotatable spacer 183 that is rotatably mounted to the movable support member 161.

A spacer housing 181 is fixed to the movable support member 161, in the region of the movable support member 161 that receives the exposed end 119b of the spool when the movable support member 161 is in the closed configuration. The spacer housing 181 is shown as a skeletal member with three support webs. Alternatively, the spacer housing could comprise a fully enclosed bowl or cover, or could be any other suitable form.

Figure 23:
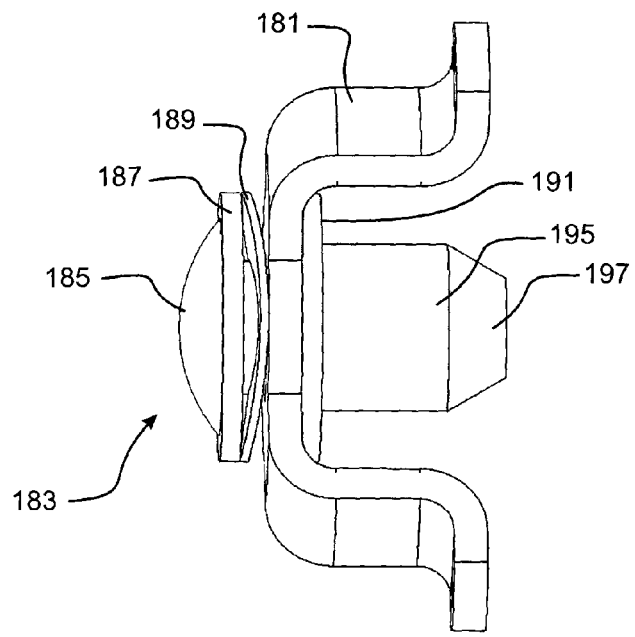
FIG. 23 is a view of the rotatable spacer and spacer housing that mounts the rotatable spacer to the movable support member in the embodiment of FIG. 15.

A rotatable spacer 183 is rotatably mounted to the movable support member 161 by being rotatably mounted in an aperture of the spacer housing 181. As shown in FIG. 23, the spacer 183 has a head 185 positioned outwardly of the spacer housing 181, and a standard washer 187 and a spring washer 189 may be positioned between the head 185 and the spacer housing. A standard washer 191 is positioned inwardly of a portion of the spacer housing.

Figure 24:
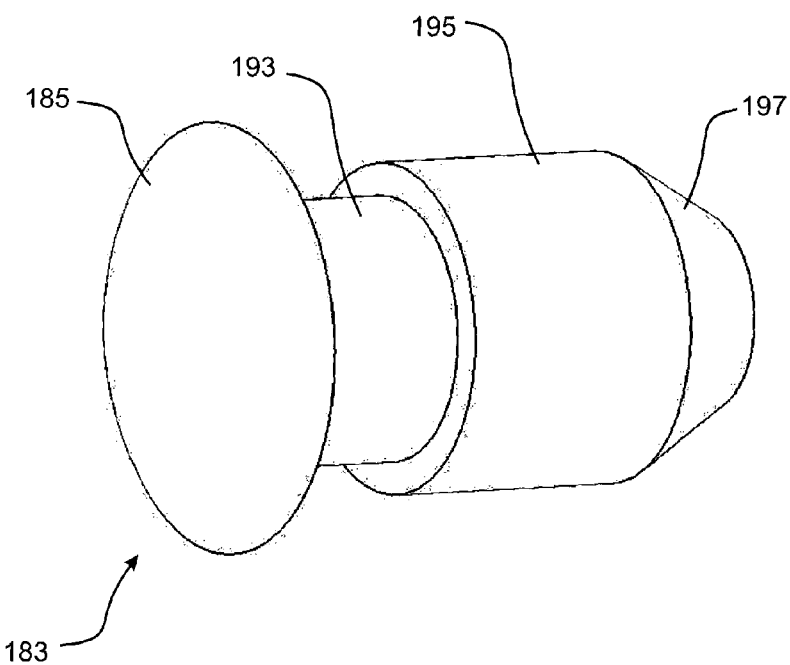
FIG. 24 is a detail view of the rotatable spacer component of the embodiment of FIG. 15.

As shown in FIG. 24, the rotatable spacer 183 is provided with a reduced diameter neck region 193 for receiving the washers 187, 189, 191. An inner portion 195 of the rotatable spacer is sized and configured to engage with the cavity 126a, 126b of the spool 119, and an innermost portion 197 of the rotatable spacer 183 is tapered to enable easy insertion of the rotatable spacer into the cavity of the spool as the movable support member 161 is moved to the closed position. The standard washers 187, 191 allow the rotatable spacer to rotate with the spool 119 as the spool rotates relative to the body 105, and the spring washer 189 maintains the rotatable spacer on a desired orientation to couple with the spool as the movable support member 161 is moved to the closed configuration. Rather than using a spring washer 189, a different biasing device could be used.

The rotatable spacer rotates upon rotation of the spool.

By engaging in the cavity 126a, 126b of the spool, and in the slot 125 of the spool, the rotatable spacer 183 minimises and preferably prevents compression of the strap in the slot by the two hub components when the device is loaded. Compression of the spool on the spacer may also assist with preventing the moveable member 161 from opening should for any reason the locking device 155 become disengaged.

The coupling between the rotatable spacer 183 and the end 119b of the spool 119 could be any other suitable form. For example, the shape of the cavity and the corresponding portion 193 of the rotatable spacer could be a different shape. Alternatively, the cavity 126a, 126b may not be present. Instead, a portion of the rotatable spacer 183 may only fit in the slot 125 between the hub components 123a, 123b. However, the cavity 126a, 126b is preferred, as it also prevents the hub components from moving out of alignment under load.

The movable support member 161 is pivotally mounted to the body 105 through a hinge 163 that is positioned at or adjacent an end of the body 105 on an opposite side of the bolt 114 from the spool 119. The movable support member 161 has an aperture 162 for receipt of the head of the bolt 114. In this configuration, the bolt 114 head stabilises the movable support member 161 when it is in the closed configuration, by engaging with the aperture 162. It will be appreciated that the bolt forms part of the body 105. Instead of engaging with the bolt head, the aperture 162 could instead engage with a similarly configured body component to stabilise the moveable support member when it is in the closed position.

Although not shown in the figures, a cover may be provided to cover part of the resistance pawl for safety and to reduce dirt ingress. A pin may extend from the base 107 of the body 105 to the cover, to provide the pivot pin 153 of the resistance pawl 151. The biasing device 157 may comprise a compression spring that acts between the cover and member 151, rather than between base projection 107' and member 151' as shown.

In this second embodiment, rather than having a torsion spring 45 biasing the drive pawl 39 into engagement with the ratchet wheels 121a, 121b, a coil spring 145 acts between an end wall of the drive arm 135 and the transverse release lever 147 to bias the lever 147 toward the spool and therefore bias the drive pawl 139 into engagement with the ratchet wheels 121a, 121b.

Additionally, in this embodiment the handle 133 is not symmetrically mounted on the drive arm 131. Instead, a small portion of the handle 133 is positioned externally of the drive arm 131 (on an opposite side from which the spool projects), and a major portion of the handle 133 is positioned inwardly over the body 105 of the ratchet device. This provides a more compact arrangement of the handle.

The devices of the preferred embodiments readily enable a strap to be fed into the spool in a lateral direction from an exposed side of the spool. This avoids the time consuming and sometimes difficult requirement to longitudinally feed the strap into the spool of the ratchet device when applying the device to the load, or longitudinally unfeed the strap from the spool when removing the device from the load.

The above describes preferred embodiments of the present invention, and modifications can be made thereto without departing from the scope of the invention.

For example, in the forms shown, the moveable member 61, 161 is pivotably mounted to the body about an axis substantially perpendicular to the rotational axis RA of the spool. In an alternative configuration, the moveable member 61, 161 could be pivotably mounted to the body about an axis substantially parallel to the rotational axis RA of the spool. For example, the moveable member 61, 161 could be mounted about a transversely-extending pivot in a position generally corresponding to the position of the hinge 63, 163 but could pivot into a closed position generally around the exposed side 19b, 119b of the spool 19, 119 from above or below. An open portion would be provided at the end of the moveable member 61, 161 corresponding to the spool, to enable that movement to occur. Again, the moveable member could be configured to support side 19b, 119b of the spool when in the closed position.

As another alternative, the moveable member 61, 161 could be slidably mounted to the body. For example, the moveable member 61, 161 could slide along the side member 11, 111 from a position in which it clears the side of the spool to a position in which it generally captures the side of the spool. An open portion would be provided at the end of the moveable member 61, 161 corresponding to the spool, to enable that movement to occur. Again, the moveable member could be configured to support side 19b, 119b of the spool when in the closed position.

However, the embodiment shown is preferable, as the end of the moveable member 61, 161 corresponding to the spool fully surrounds the exposed side 19b, 119b of the spool when the moveable member 61, 161 is in the closed position, and thereby provides better load support on the spool.

As another alternative, rather than having a slot 25, 125 extending into the spool 19, 119 from side 19b, 119b the hub of the spool could be solid. Instead, a retaining feature could be provided on the spool, such as an arm that is fixed to the ratchet wheel 21, 121b and extends parallel to the hub, so part of the strap can be held between the arm and the hub for initial winding after being loaded in a lateral direction into the spool between from the exposed side of the spool.

Figure 15:
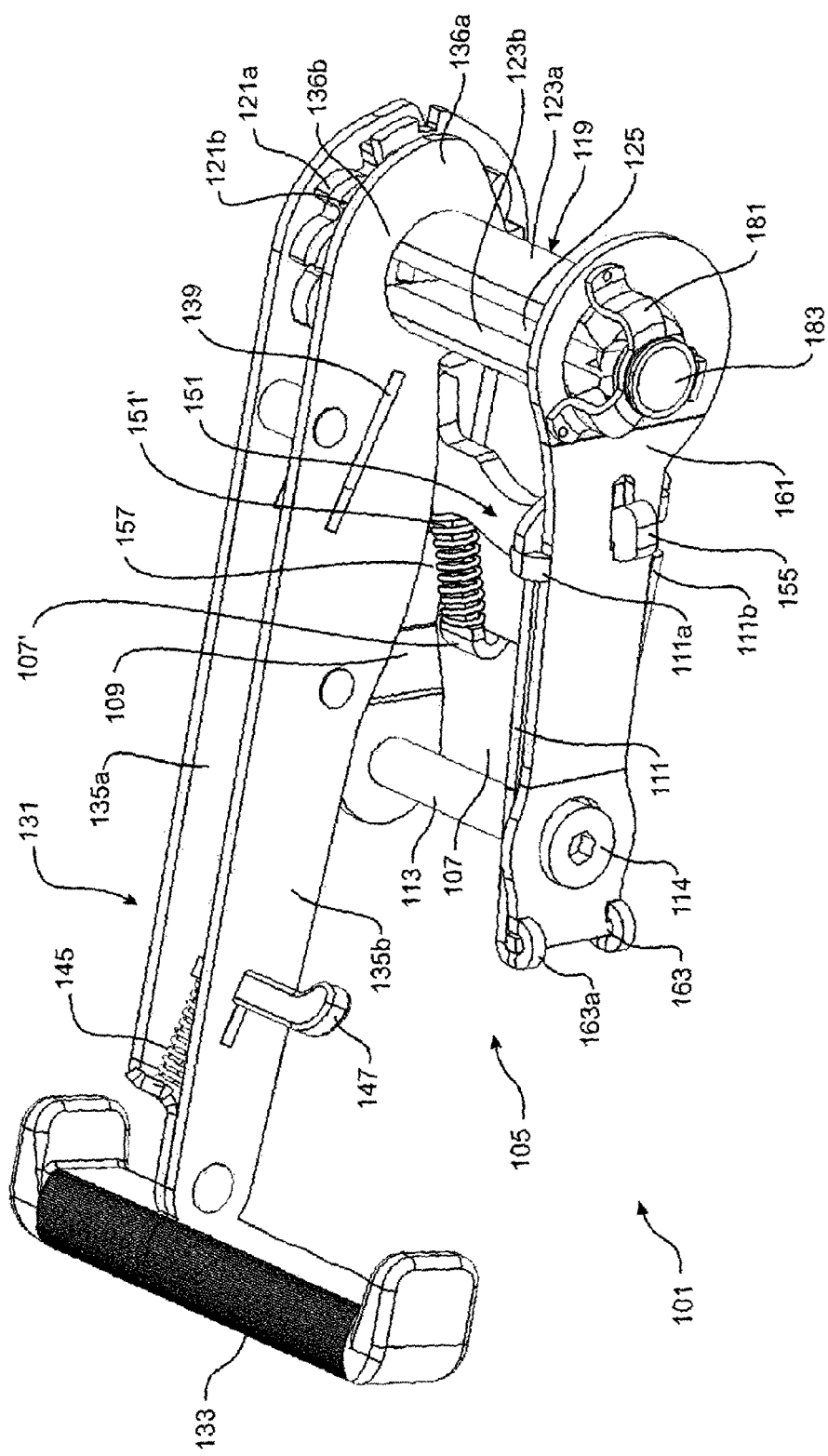
FIG. 15 is a perspective view from above of a load securement ratchet device in accordance with a second embodiment of the present invention.
Figure 16:
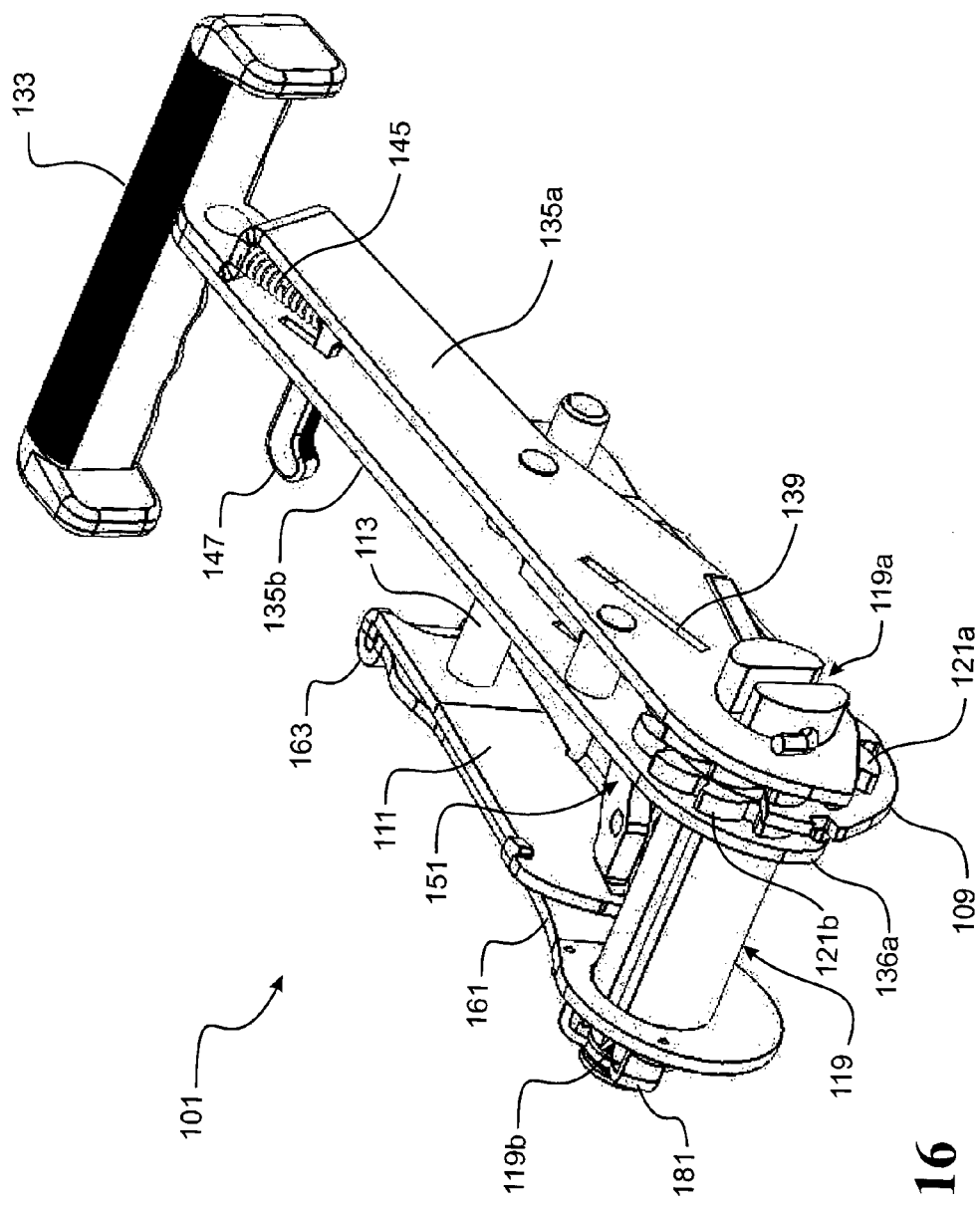
FIG. 16 is a perspective view from above of the other side of the ratchet device of FIG. 15.
Figure 17:
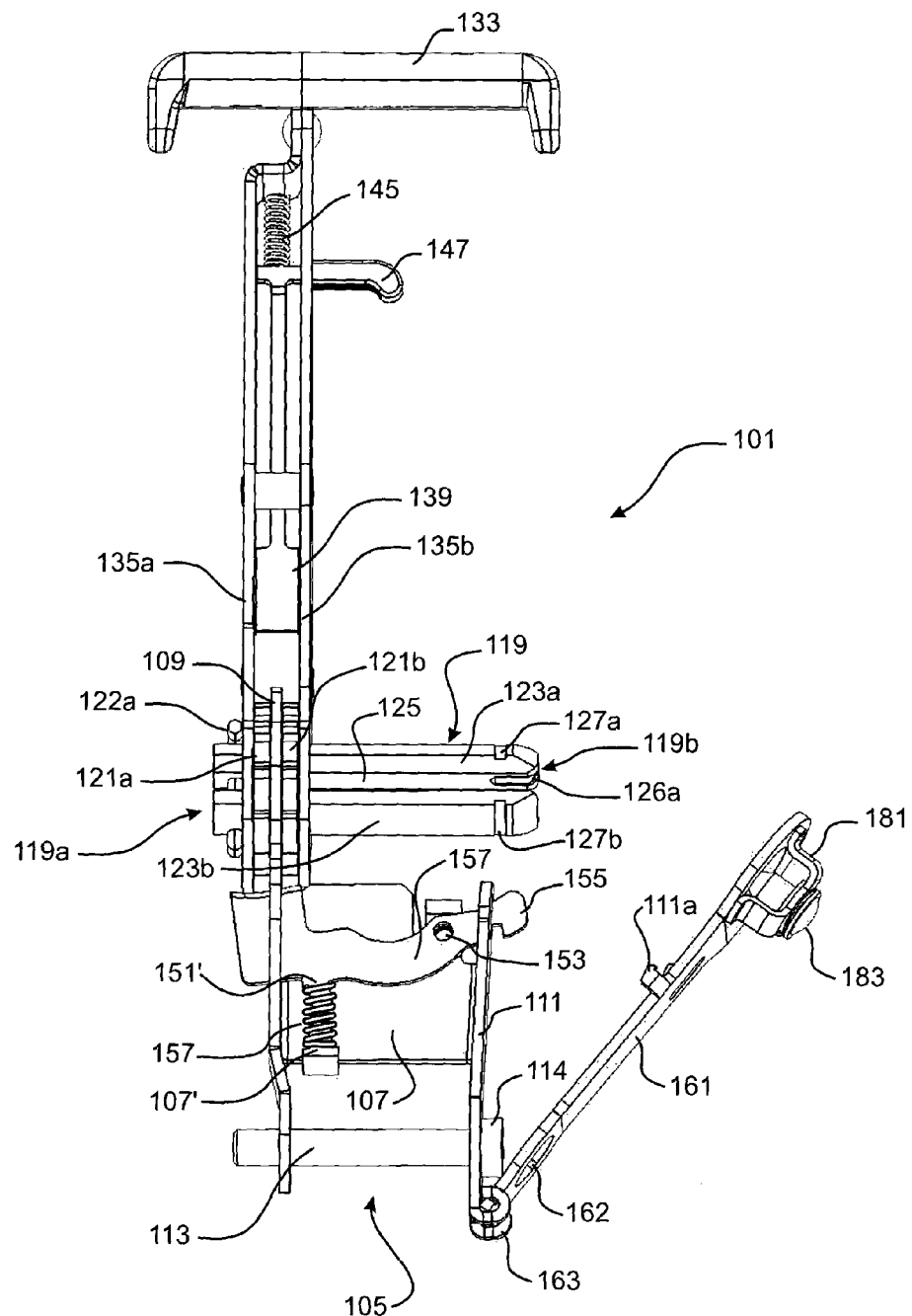
FIG. 17 is a view from above of the ratchet device of FIG. 15, with the ratchet device arm in an unlocked position and the support member in an open position.
Figure 18:
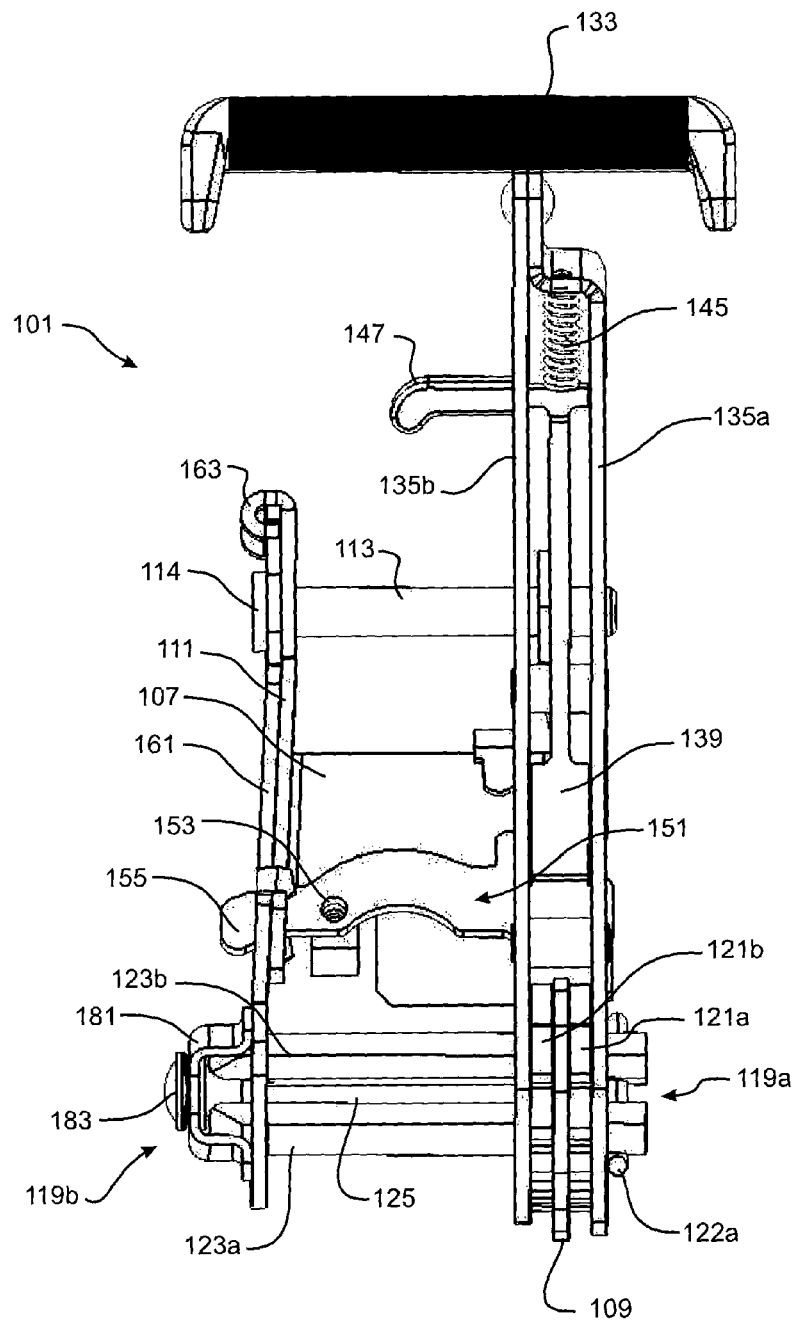
FIG. 18 is a view from above of the ratchet device of FIG. 15, with the ratchet drive arm and the support member in a closed position.
Figure 19:
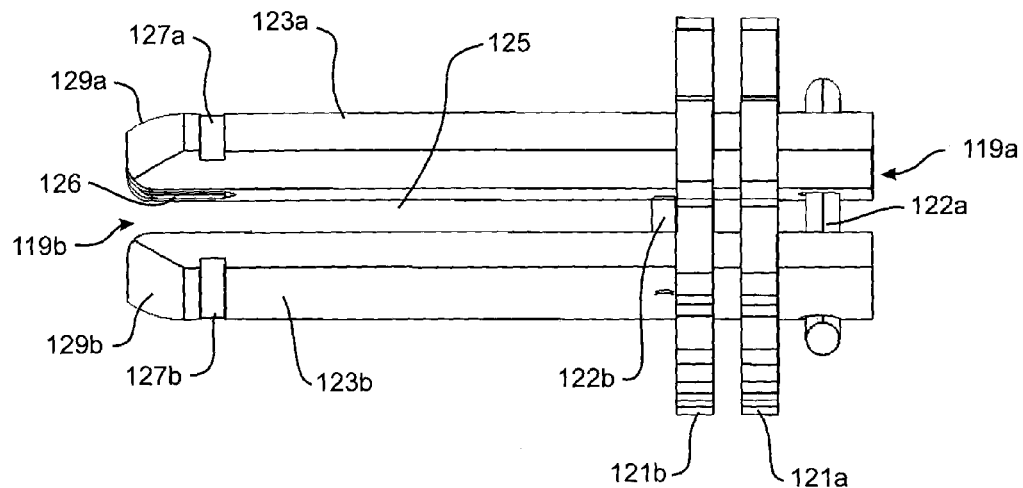
FIG. 19 is a view of the spool of the embodiment of FIG. 15.

As another example, in the form shown the outer tine 35a of the drive arm 31 is provided with an eccentric portion 36a to disengage the resistance pawl 51 from the ratchet wheel 21 when the drive arm is in the unlocked position. Alternatively, the inner tine 35b or both tines 35a, 35b could be provided with eccentric portions 36a. The eccentric portion is preferably provided on the inner tine 35b, as that better accommodates the angular change of the resistance pawl 51. FIG. 15 shows such an embodiment.

While the ratchet device has been described as being used for securing a load, the ratchet device could also be used for other applications such as lifting a load for example.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

The invention claimed is:

1. A ratchet device for a strap, the ratchet device comprising:
   a body comprising a first side member and a second side member, the first side member and the second side member being attached to each other by a base; and
   a spool comprising a first side rotatably supported by the first side member and a ratchet wheel fixed thereto the spool further comprising a second side that is free of the second side member;
   wherein the body further comprises a movable member that is mounted to the second side member and movable between an open position in which the second side of the spool is exposed to enable a strap to be laterally loaded into the spool from the exposed side of the spool and laterally unloaded from the spool, and a closed position in which said lateral loading and unloading are prevented.

2. The ratchet device as claimed in claim 1, wherein the spool comprises a hub, and wherein a slot extends into the spool from the exposed side of the spool so that the strap can be fed into the slot sideways, without bending the strap across its width.

3. The ratchet device as claimed in claim 2, wherein the hub comprises a plurality of separate hub components.

4. The ratchet device as claimed in claim 3, comprising a rotatable spacer that is rotatably mounted to the movable member and that is configured to couple with said second side of the spool when the movable member is in the closed position, to minimize compression of the strap between the hub components under load, and to assist in preventing the movable member from opening.

5. The ratchet device as claimed in claim 4, wherein said second side of the spool comprises a cavity proximate to the slot and a portion of the rotatable spacer is configured to engage in the cavity.

6. The ratchet device as claimed in claim 1, wherein the spool comprises two ratchet wheels positioned at or adjacent the first side of the spool that is rotatably supported by the first side member of the body.

7. The ratchet device as claimed in claim 6, wherein one ratchet wheel is positioned on either side of the first side member of the body.

8. The ratchet device as claimed in claim 1, comprising a resistance pawl mounted to the body to resist unwinding of the spool, wherein part of the resistance pawl forms part of a lock for locking the movable member in the closed position.

9. The ratchet device as claimed in claim 8, wherein the resistance pawl is configured such that when the resistance pawl engages the ratchet wheel the lock is in a locking configuration, and when the resistance pawl is disengaged from the ratchet wheel the lock is in an unlocked configuration.

10. The ratchet device as claimed in claim 9, wherein the resistance pawl is biased into engagement with the ratchet wheel.

11. The ratchet device as claimed in claim 8, comprising a ratchet drive arm used to drive movement of the spool, wherein the ratchet drive arm is moveable relative to the body between a closed position and an unlocked position, and wherein the ratchet drive arm is configured to disengage the resistance pawl from engagement with the ratchet wheel, and thereby move the lock to the unlocking configuration, when the ratchet drive arm is moved to the unlocked position.

12. The ratchet device as claimed in claim 11, wherein the ratchet drive arm comprises two tines separated by spacers and a ratchet drive pawl housed between the tines.

13. The ratchet device as claimed in claim 12, wherein the spool comprises two ratchet wheels positioned at or adjacent the first side of the spool that is rotatably supported by the first side member of the body, wherein one ratchet wheel is positioned on either side of the first side member of the body, and wherein one tine is positioned adjacent each ratchet wheel, on a side of the respective ratchet wheel opposite the first side member of the body.

14. The ratchet device as claimed in claim 12, comprising a release member for disengaging the ratchet drive pawl from the ratchet wheel wherein the ratchet drive arm can only be moved to the unlocked position when the ratchet pawl is released by the release member.

15. The ratchet device as claimed in claim 1, wherein the movable member is slidably mounted to the body and the movable member is configured as a support member and supports said second side of the spool when the moveable support member is in the closed position.

16. The ratchet device as claimed in claim 15, wherein the spool has a rounded profile at said other side, to assist with moving the movable support member to the closed position.

17. The ratchet device as claimed in claim 15, wherein the spool comprises grooves for receiving part of the movable support member when in the closed position.

18. The ratchet device as claimed in claim 15, wherein the body comprises at least one guide for guiding movement of the movable support member into the closed position, with each guide supporting a respective position of the movable support member when in the closed position, to help minimize twisting of the spool in use.

19. The ratchet device as claimed in claim 1, wherein the movable member is pivotably mounted to the body about an axis substantially parallel or substantially perpendicular to a rotational axis of the spool, the axis is positioned at or adjacent an end of the body distal the spool, and the movable member comprises an aperture to engage with part of the body when the movable member is in the closed position to provide support to the movable member.

20. A method of securing a load on a vehicle or platform, comprising using one or more ratchet devices as claimed in claim 1, and wherein, if required, an additional like ratchet device may be used to provide additional tension to the strap after the strap is in place.

* * * * *